(12) United States Patent
Miyabe et al.

(10) Patent No.: US 9,901,045 B2
(45) Date of Patent: Feb. 27, 2018

(54) HYDROPONIC CULTIVATION METHOD

(71) Applicant: FUJITSU LIMITED, Kawasaki-shi, Kanagawa (JP)

(72) Inventors: Haruyasu Miyabe, Onuma (JP); Tatsuo Muraoka, Aizuwakamatsu (JP); Akihiko Satoh, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/215,092

(22) Filed: Jul. 20, 2016

(65) Prior Publication Data

US 2016/0324089 A1 Nov. 10, 2016

Related U.S. Application Data

(63) Continuation of application No. PCT/JP2015/050863, filed on Jan. 15, 2015.

(30) Foreign Application Priority Data

Jan. 24, 2014 (JP) ................................ 2014-011885
Jan. 24, 2014 (JP) ................................ 2014-011886
Jan. 24, 2014 (JP) ................................ 2014-011888

(51) Int. Cl.
*A01G 31/06* (2006.01)
*A01G 7/04* (2006.01)

(52) U.S. Cl.
CPC ............. *A01G 31/06* (2013.01); *A01G 7/045* (2013.01); *Y02P 60/216* (2015.11)

(58) Field of Classification Search
CPC ........ A01G 1/001; A01G 7/045; A01G 9/022; A01G 9/023; A01G 9/104; A01G 9/1066;
(Continued)

(56) References Cited

U.S. PATENT DOCUMENTS

| 4,196,544 A | 4/1980 | Davis et al. |
| 4,567,732 A | 2/1986 | Landstrom et al. |

(Continued)

FOREIGN PATENT DOCUMENTS

| CH | 697 385 B1 | 9/2008 |
| CN | 102668964 A | 9/2012 |

(Continued)

OTHER PUBLICATIONS

Japanese Platform for Patent Information, Publication No. 2013-59291, published Apr. 4, 2013.

(Continued)

*Primary Examiner* — Lisa L Tsang
(74) *Attorney, Agent, or Firm* — Staas & Halsey LLP

(57) ABSTRACT

A hydroponic cultivation system for plants includes a first plant cultivation apparatus to hydroponically cultivate plants using a first liquid fertilizer, a first supply path to supply the first liquid fertilizer, a second plant cultivation apparatus to hydroponically cultivate plants using a second liquid fertilizer having a component differing from a component of the first liquid fertilizer, a second supply path to supply the second liquid fertilizer, and a tray carrier device to carry cultivation trays with the plants thereon between the first plant cultivation apparatus and the second plant cultivation apparatus. The cultivation trays are arranged in stages and mutually connected in series to the first supply path via a removable hose in the first plant cultivation apparatus, and the cultivation trays are arranged in stages and mutually connected in series to the second supply path via a removable hose in the second plant cultivation apparatus.

2 Claims, 11 Drawing Sheets

(58) Field of Classification Search
CPC ...... A01G 9/108; A01G 9/1423; A01G 9/143; A01G 9/246; A01G 2025/006; A01G 27/003; A01G 27/005; A01G 27/008; A01G 2031/006; A01G 31/06
USPC ... 47/60, 62 R, 62 C, 62 N, 17, 18, 65, 66.1, 47/66.7, 79, 39, 82, 83, 48.5, 58.1 R, 47/58.1 LS
See application file for complete search history.

(56) References Cited

U.S. PATENT DOCUMENTS

| | | | |
|---|---|---|---|
| 5,713,154 A | 2/1998 | Goldstein et al. | |
| 5,856,190 A * | 1/1999 | Iwai | A01G 31/06 435/420 |
| 6,279,263 B1 | 8/2001 | Lai | |
| 2007/0062105 A1 | 3/2007 | Stevens | |
| 2010/0105309 A1 | 4/2010 | Ishibashi | |
| 2010/0126063 A1 | 5/2010 | Emoto | |
| 2011/0192082 A1 | 8/2011 | Uchiyama | |
| 2012/0054061 A1 | 3/2012 | Fok et al. | |
| 2013/0255149 A1 | 10/2013 | Jung | |
| 2014/0017043 A1* | 1/2014 | Hirai | A01G 31/02 414/267 |
| 2014/0165468 A1* | 6/2014 | Roeser | A01G 9/12 47/62 R |
| 2014/0259920 A1 | 9/2014 | Wilson | |
| 2014/0366443 A1* | 12/2014 | Brusatore | A01G 31/06 47/66.7 |
| 2015/0107154 A1* | 4/2015 | Visser | A01G 9/143 47/66.6 |

FOREIGN PATENT DOCUMENTS

| | | |
|---|---|---|
| EP | 2 132 977 A1 | 12/2009 |
| GB | 432036 | 7/1935 |
| JP | 60-49758 | 4/1985 |
| JP | 63-13553 | 1/1988 |
| JP | 64-30524 | 2/1989 |
| JP | 64-30525 | 2/1989 |
| JP | 7-227162 | 8/1995 |
| JP | 7-231731 | 9/1995 |
| JP | 8-68554 | 3/1996 |
| JP | 3024261 | 5/1996 |
| JP | 3031461 | 11/1996 |
| JP | 9-248065 | 9/1997 |
| JP | 2000-157077 | 6/2000 |
| JP | 2007-206895 | 8/2007 |
| JP | 2007-289056 | 11/2007 |
| JP | 2007-306895 | 11/2007 |
| JP | 2008-61570 | 3/2008 |
| JP | 4440192 | 3/2010 |
| JP | 4451492 | 4/2010 |
| JP | 2011-36226 | 2/2011 |
| JP | 2011-78350 | 4/2011 |
| JP | 2012-200222 | 10/2012 |
| JP | 5057882 | 10/2012 |
| JP | 2012-217392 | 11/2012 |
| JP | 2013-39500 | 2/2013 |
| JP | 2013-59291 | 4/2013 |
| JP | 2013-192552 | 9/2013 |
| WO | 2013/082601 A1 | 6/2013 |

OTHER PUBLICATIONS

Japanese Platform for Patent Information, Publication No. 2013-39500, published Feb. 28, 2013.
Espacenet Bibliographic data, Japanese Publication No. 64-30524, published Feb. 1, 1989.
Espacenet Bibliographic data, Japanese Publication No. 2007-306895, published Nov. 29, 2007.
Espacenet Bibliographic data, Japanese Publication No. 4440192, published Mar. 24, 2010.
Espacenet Bibliographic data, Japanese Publication No. 9-248065, published Sep. 22, 1997.
Japanese Platform for Patent Information, Publication No. 64-30525, published Feb. 1, 1989.
Espacenet Bibliographic data, Japanese Publication No. 2000-157077, published Jun. 13, 2000.
Espacenet Bibliographic data, Japanese Publication No. 7-231731, published Sep. 5, 1995.
Espacenet Bibliographic data, Japanese Publication No. 7-227162, published Aug. 29, 1995.
Japanese Platform for Patent Information, Publication No. 60-49758, published Apr. 8, 1985.
Espacenet Bibliographic data, Japanese Publication No. 2008-61570, published Mar. 21, 2008.
English Abstract for Japanese Publication No. 4451492, published Apr. 14, 2010 from WO 2008/136215 published Nov. 13, 2008.
Espacenet Bibliographic data, Japanese Publication No. 5057882, published Oct. 24, 2012.
Espacenet Bibliographic data, Japanese Publication No. 2011-36226, published Feb. 24, 2011.
Espacenet Bibliographic data, Japanese Publication No. 2007-289056, published Nov. 8, 2007.
Espacenet Bibliographic data, Japanese Publication No. 8-68554, published Mar. 12, 1996.
Japanese Platform for Patent Information, Publication No. 2013-192552, published Sep. 30, 2013.
Espacenet Bibliographic data, Japanese Publication No. 2011-78350, published Apr. 21, 2011.
International Search Report dated Apr. 21, 2015 in corresponding International Application No. PCT/JP2015/050863.
Written Opinion of the International Searching Authority dated Apr. 21, 2015 in corresponding International Application No. PCT/JP2015/050863.
Patent Abstracts of Japan, Publication No. 2012-200222 published Oct. 22, 2012.
Espacenet English abstract, Publication No. 102668964 published Sep. 19, 2012.
Espacenet English abstract, Publication No. 697 385 B1 published Sep. 15, 2008.
Partial Supplementary European Search Report dated Dec. 13, 2016 in corresponding European Patent Application No. 15740272.8.
Office Action for U.S. Appl. No. 15/215,100 dated Mar. 28, 2017.
Extended European Search Report dated Mar. 23, 2017 in corresponding European Patent Application No. 15740272.8.
Office Action for corresponding Korean Patent Application No. 10-2016-7019771, dated Sep. 15, 2017.
Office Action for corresponding Japanese Patent Application No. 2014-011886, dated Oct. 3, 2017.
Patent Abstracts of Japan English Abstract for JP 2007-206895, published Aug. 16, 2007.
Office Action for corresponding Japanese Patent Application No. 2014-011888, dated Sep. 19, 2017.
Office Action for corresponding Japanese Patent Application No. 2014-011885, dated Sep. 19, 2017.
Patent Abstracts of Japan for Japanese Patent Application Publication No. 2012-217392, published Nov. 12, 2012.
Office Action for corresponding Korean Patent Application No. 10-2017-7035947, dated Dec. 29, 2017.

* cited by examiner

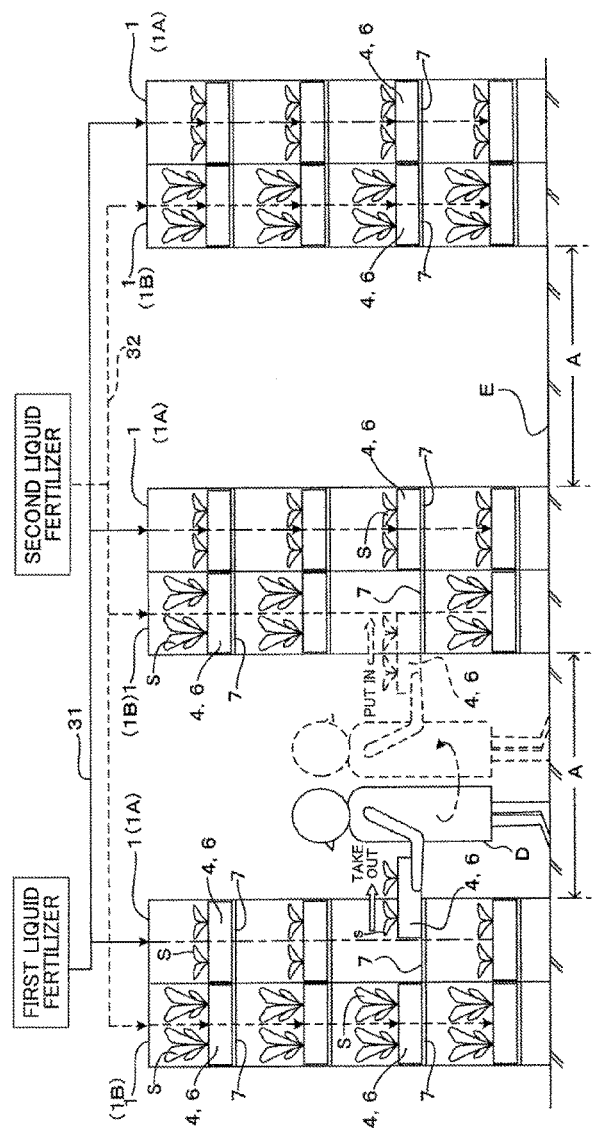

HYDROPONIC CULTIVATION METHOD

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2015/050863, filed on Jan. 15, 2015, which claims the benefit of priority of the prior Japanese Patent Application No. 2014-011886, filed on Jan. 24, 2014, Japanese Patent Application No. 2014-011888, filed on Jan. 24, 2014, and Japanese Patent Application No. 2014-011885, filed on Jan. 24, 2014, the entire contents of which are incorporated herein by reference.

FIELD

The disclosures discussed herein relate to a hydroponic cultivation system, a hydroponic cultivation method, a plant cultivation system, and a plant cultivation apparatus.

BACKGROUND

In a plant growth technology, plant cultivation systems using multiple racks or stages are proposed. The plant cultivation systems are designed to cultivate plants such as vegetables, medical herbs and flowers in high density within relatively small space. Hydroponic cultivation systems are about the simplest of all the plant cultivation systems to facilitate control of plant diseases or plant contamination, and enable annual cultivation of plants. To implement such hydroponic cultivation systems, confined plant cultivation systems utilizing artificial light in a confined space are put to practical use, and there are disclosed plant cultivation systems utilizing cleanrooms as the confined space.

For example, there is a plant cultivation system having a unitized cultivation room composed of a cleanroom known in the art. Such a cultivation room includes one cultivation shelf or two or more cultivation shelves having removable cultivation blocks. The cultivation room further includes a robot mechanism including a handling robot configured to place the cultivation blocks on the cultivation shelves or remove the cultivation blocks from the cultivation shelves, and rails for moving the handling robot inside the cultivation room. The cultivation room still further includes a hydroponic solution supply unit configured to supply a hydroponic solution to the cultivation blocks placed on the cultivation shelves, and a lighting unit configured to apply light to the cultivation blocks placed on the cultivation shelves.

The cleanroom may be a down-flow cleanroom for use in fabrication of electronic devices such as semiconductor devices. The down-flow cleanroom includes a ceiling slab face and a ceiling downwardly spaced apart from the ceiling slab face, where the ceiling includes air supply holes, and air filters are disposed above the ceiling. Further, a floor having a large number of suction holes is disposed below the ceiling, where air supplied from the ceiling is directly suctioned into the suction holes immediately below the ceiling, and the suctioned air is discharged outside.

Regardless of a confined or non-confined system, the following technologies are proposed as hydroponic cultivation apparatuses.

For example, there is known in the art a hydroponic cultivation apparatus including a structure having a base plate, lattice members disposed above the base plate on which plant cultivation containers are placed, and shelf plates incorporating lighting devices disposed above the lattice members to illuminate below. The lattice members and the shelf plates are adjustable in upward and downward directions.

In addition, the following structures are known in a plant cultivation apparatus having plant cultivation racks for cultivating plants on shelves.

In the disclosed plant cultivation apparatus having adjacent multiple racks, the racks at opposite ends have shelves having cultivation containers in parallel along a frontage direction so that the cultivation containers are flexibly handled between the working passage and the corresponding rack. Intermediate racks include shelves having the cultivation containers in parallel along a frontage direction so that the cultivation containers are flexibly handled between the working passage at one of the sides and the corresponding intermediate rack. Further, ceilings of all the racks are covered with ceiling-side light reflectors, and back of the two racks at opposite ends are covered with back-side vertical light reflectors. Light sources of the lighting devices are disposed beneath the ceiling-side light reflectors disposed at upper parts of the shelves.

The plant cultivation shelves on which cultivation containers are placed are provided with guide rollers so as to be taken in or out at the front side of the shelves.

The disclosed cultivation apparatus for peanut sprouts includes growing cases in which multiple growing trays for growing peanut sprouts are arranged in stages. The growing case includes guiderails for flexibly handling the growing trays. The guiderails on which the growing trays are slidably placed are disposed in stages on the left wall and the right wall of the growing case. In this structure, when stems of the sprouts stop growing, the growing trays are automatically transferred to a tray carriage, and the tray carriage is then carried out of the growing room for harvesting the peanut sprouts.

The disclosed cultivation apparatus including trays in which artificial cultivation media are placed has a structure to accommodate the trays in multiple stages, and each of the trays in the multiple stages is flexibly housed in or removed from the case of the cultivation apparatus using holders. The left and right sides of the case are provided with approximately linear holders for holding the trays and guiding the trays to be flexibly housed in or removed from the case of the cultivation apparatus. The holders having the same heights are placed on the left and the right sides of the case such that the holders on the left side face the holders on the right side. In this structure, the plants may directly receive sunlight by drawing the trays outside in daytime, thereby promoting the growth of the plants.

The plant cultivation apparatuses having the shelves, trays, the lattice members, and the like may be provided with lighting devices such as fluorescent tubes arranged above the respective shelves, trays, or lattice members shelf so as to expose the plants to light, with exception of the apparatuses for growing peanut sprouts that requires a dark room.

The disclosed hydroponic cultivation method for leaf vegetables is capable of growing the leaf vegetables by controlling potassium content of the culture media to produce low potassium-containing leaf vegetables. This method includes adding potassium to the water culture medium without reducing the potassium content in an initial period of hydroponically cultivating the leaf vegetables, and replacing the water culture medium containing the potassium element $KNO_3$ with the water culture medium containing $NaNO_3$ having concentration the same as that of the potassium element $KNO_3$ in a subsequent period until cropping for seven to ten days. In this case, pH of the water culture medium is adjusted by using NaOH within a range of 6.0 to 6.5 on the pH scale throughout the cultivation period.

RELATED ART DOCUMENTS

Patent Documents

Patent Document 1: Japanese Laid-open Patent Publication No. 2007-289056
Patent Document 2: Japanese Laid-open Patent Publication No. 8-68554
Patent Document 3: Japanese Laid-open Patent Publication No. 2013-192552
Patent Document 4: Japanese Laid-open Patent Publication No. 2011-078350
Patent Document 5: Japanese Laid-open Patent Publication No. 9-248065
Patent Document 6: Japanese Laid-open Patent Publication No. 1-30525
Patent Document 7: Japanese Laid-open Patent Publication No. 2000-157077
Patent Document 8: Japanese Registered Utility Model No. 3024261
Patent Document 9: Japanese Laid-open Patent Publication No. 7-231731
Patent Document 10: Japanese Laid-open Patent Publication No. 7-227162
Patent Document 11: Japanese Laid-open Patent Publication No. 2011-36226

Although plant cultivation does not require fabricating microscopic patterns such as those of electronic devices, the cleanroom constructed in an electronic device fabrication plant may be used for the plant cultivation. However, the cleanroom for cultivating plants does not require stringent conditions in terms of dust and dirt, floating matter, and airflow rate required for the cleanroom for the electronic devices. Hence, if the cleanroom for the electronic devices is used for cultivating plants without any change, the cleanroom may have excessive capacity of such as air conditioning for growing plants.

The environment required for the electronic device fabrication may differ from the environment required for the plant cultivation. For example, the plant cultivation requires water, liquid fertilizers, and the like, and the cleanroom for plant cultivation thus has high humidity. These kinds of environmental conditions are not necessarily suitable as the cleanroom for fabricating the electronic devices.

Cultivating a large number of plants using the cultivation shelves in a confined space may result in high density of plants as the plants grow, which interferes with airflow rates. Further, the solution having nutrient may drip on the floor while moving the cultivating plants, which needs to be handled by the design of the facility.

The plant cultivation apparatus with artificial light is configured to cultivate plants by applying light from the lighting devices. However, heat generated by the lighting device may adversely affect the growth of the plants. For example, it is undesirable to accumulate heat generated from the lighting devices in the vicinity of the cultivation shelves when plants that grow in a microthermal climate are placed on the cultivation shelves. Thus, a skeletal rack structure formed by removing the side plates of the cultivation shelves may be employed to facilitate circulation of the ambient air of the cultivation shelves.

On the other hand, it may also be desirable to change the distance between the plants and lighting devices according to the growth of the plants because sufficient light may be needed for growing the plants. In addition, it is preferable to apply light to each plant multidirectionally except from the ground in order to maintain the color and growth of the leaves and the like approximately at the same levels.

However, in the cultivation shelves composed of the skeletal structure of the rack, especially, near the end parts of the cultivation shelves, light generated from the lighting devices passes through the skeletal structure of the rack while diffusing, which may reduce the amount of reflection within the rack. Such reduction in the amount of light applied to the plants may be prevented by arranging the plants toward the centers where the lighting devices are placed. However, there may be unused areas on the shelves in the vicinity of the end parts of the lighting devices despite the fact that there are sufficiently wide areas for growing plants on the shelves.

To utilize the unused areas on the shelves, light reflector members may be fixed to the columns of the skeletal structure of the cultivation shelves. However, the light reflector members may interfere with the air circulation or the operator's handling the plants from the sides of the rack, which may degrade work efficiency.

Further, liquid fertilizer hoses, movable pipes, nozzles, and the like are attached to the cultivation trays disposed on the cultivation shelves; however, it may be preferable to efficiently attach or detach the hoses in the structure in which the hoses are removed from the cultivation trays when the cultivation trays are replaced. The flexible pipes are easy to bend but easily accumulate liquid in the bent parts of the pipes. The liquid may leak out while handling the flexible pipes through which the liquid fertilizer is passed.

In the structure in which the edge of the cultivation tank is formed in a stepwise configuration to be fitted in the edge of the lid, high processing accuracy may be required for forming the steps. In addition, the lid may be more susceptible to warping as the size of the lid increases, which may make it difficult to fit the edge of the cultivation tank to the edge of the lid.

As described above, the potassium-containing solution is replaced with the solution that does not contain potassium in order to adjust the potassium content of the cultivation media. However, the potassium-containing water culture medium is discharged from the containers in which the leaf vegetables are planted before the potassium-containing water culture medium is supplied to the containers in place of the new water culture medium. Hence, the replacement or the collection of the water culture medium may need more time, which may degrade the work efficiency.

SUMMARY

According to an aspect of embodiments, there is provided a hydroponic cultivation system for plants. The hydroponic cultivation system includes a first plant cultivation apparatus configured to hydroponically cultivate plants using a first liquid fertilizer; a first supply path disposed in the first plant cultivation apparatus, and configured to supply the first liquid fertilizer; a second plant cultivation apparatus configured to hydroponically cultivate plants using a second liquid fertilizer having a component differing from a component of the first liquid fertilizer; a second supply path disposed in the second plant cultivation apparatus, and configured to supply the second liquid fertilizer; and a tray carrier device configured to carry cultivation trays with the plants thereon between the first plant cultivation apparatus and the second plant cultivation apparatus, wherein the cultivation trays are arranged in a plurality of stages, and mutually connected in series to the first supply path via a removable hose in the first plant cultivation apparatus, and the cultivation trays are arranged in a plurality of stages, and mutually connected in series to the second supply path via a removable hose in the second plant cultivation apparatus.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF DRAWINGS

FIG. 7 is a side view illustrating an example of a liquid fertilizer supply system in the plant cultivation apparatus introduced in the plant cultivation system according to an embodiment;

DESCRIPTION OF EMBODIMENTS

Figure 1:
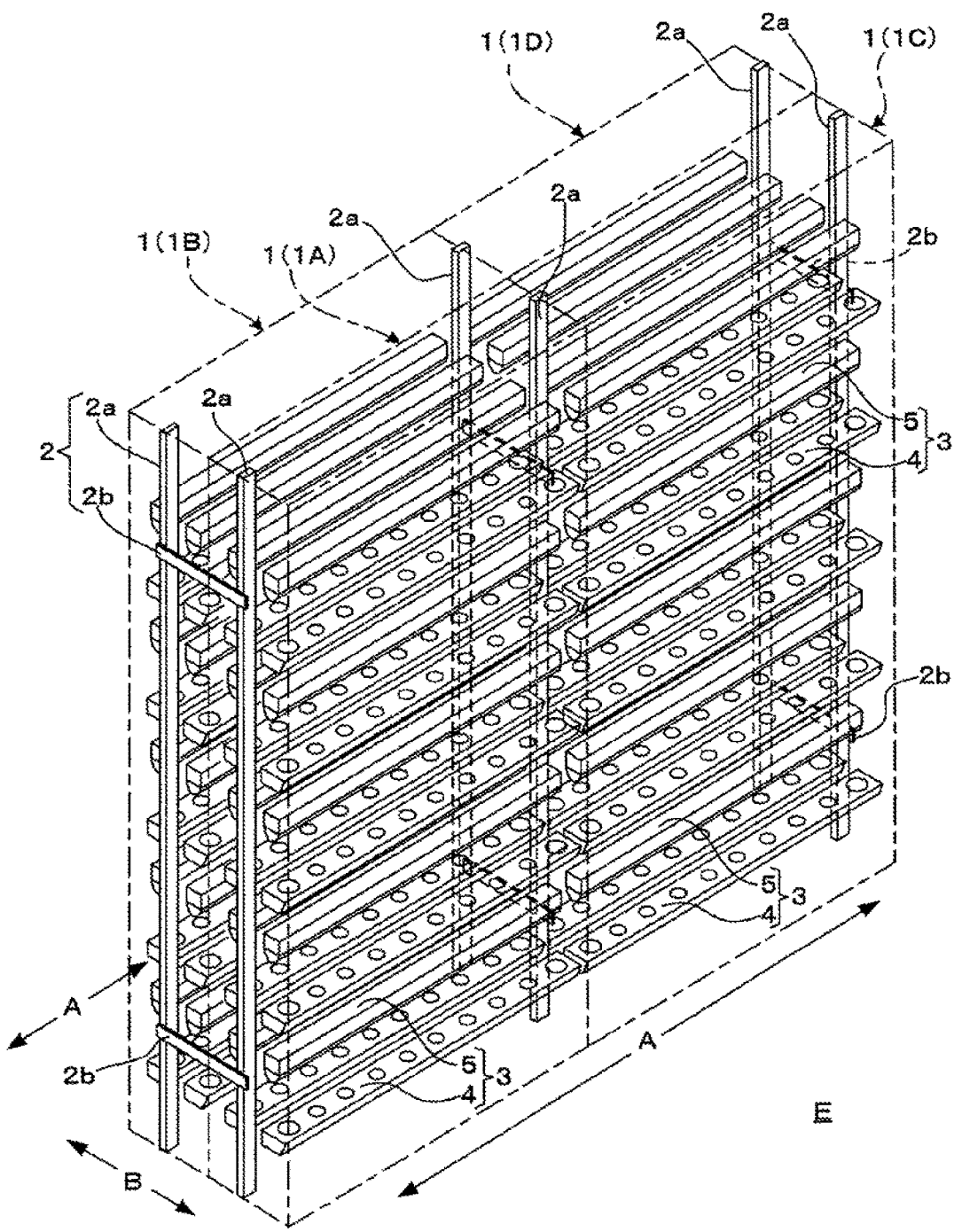
FIG. 1 is a perspective view illustrating an outlined configuration example of a plant cultivation apparatus introduced in a plant cultivation system according to an embodiment.

The following illustrates embodiments with reference to the accompanying drawings. In the drawings, similar components may be provided with the same reference numbers. FIG. 1 is a perspective view illustrating an outlined configuration example of a plant cultivation apparatus according to an embodiment, and FIG. 2 is a front view illustrating an example of the plant cultivation apparatus according to an embodiment according to the embodiment.

Figure 2:
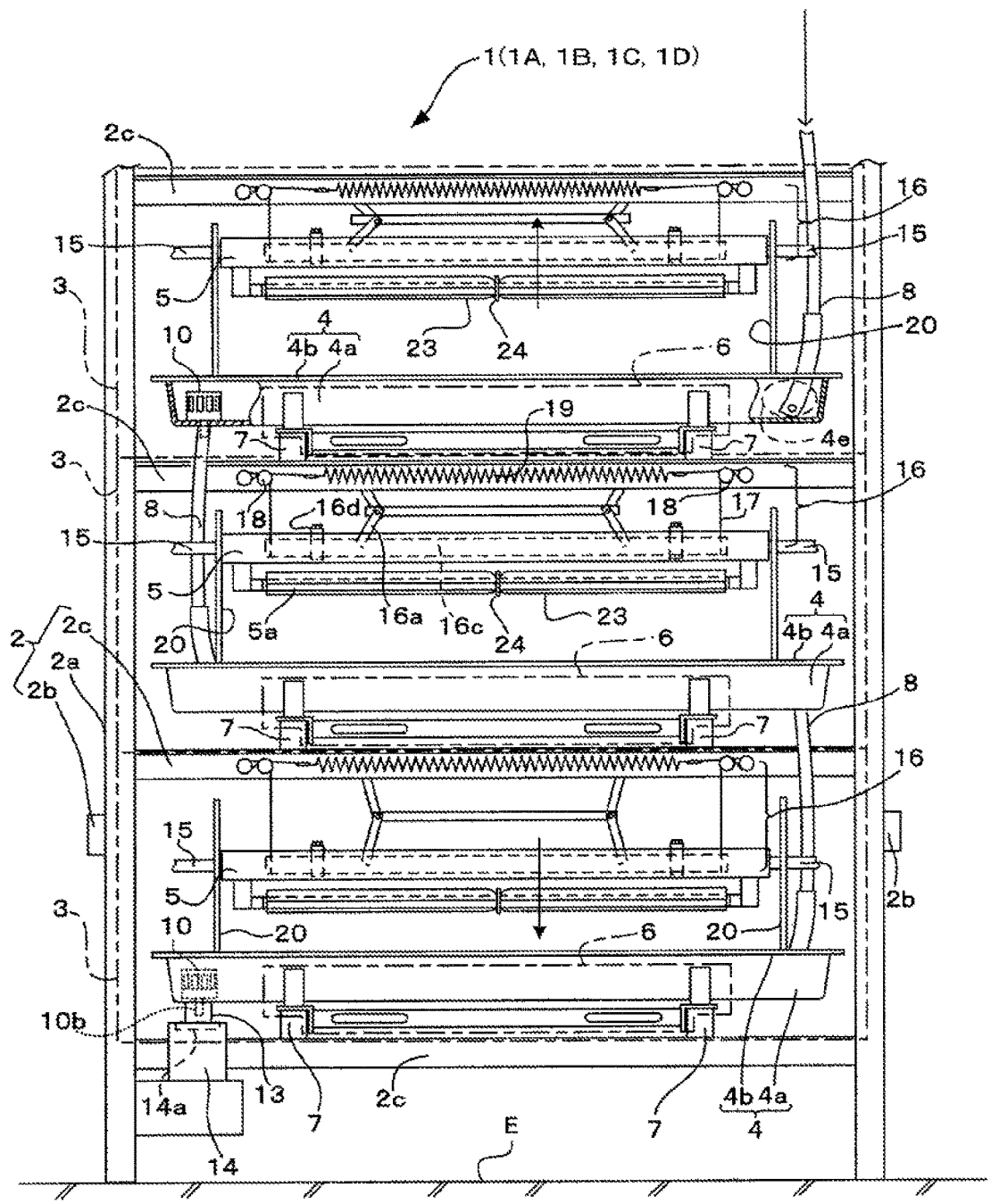
FIG. 2 is a front view illustrating an example of a cultivation unit attached to the plant cultivation apparatus introduced in the plant cultivation system according to an embodiment.

In FIGS. 1 and 2, cultivation units 3 each having a cultivation tray 4 and a lighting device 5 disposed above the cultivation tray 4 are attached in multiple stages, e.g., at least three stages, in a height direction within a cultivation rack 2. In FIG. 1, two or more plant cultivation apparatuses 1A and 1C (1B and 1D) are adjacently arranged along a first passage A within a plant cultivation room of a confined space such as a cleanroom 51, and two or more plant cultivation apparatuses 1A and 1B (1C and 1D) are adjacently arranged along a second passage B in a depth direction approximately orthogonal to the first passage A.

However, when two or more first passages A and two or more second passages B are arranged in orthogonal directions, one cultivation apparatus may be considered as a set of the plant cultivation apparatuses 1A, 1B, 1C and 1D placed in respective areas sectioned by the first passages A and the second passages B.

The first passage A viewed directly from the top of the plant cultivation apparatus 1 is an area or a side where cultivation trays 4 are taken out or put in, and may hereinafter be referred to as a "front side".

The two or more plant cultivation apparatuses 1 (1A, 1C, 1B and 1D) illustrated in FIG. 1 are adjacently arranged along the first passage A (area indicated by a dash-dot line in FIG. 10B) within the plant cultivation room of the confined space such as a later-described cleanroom 51, and are also adjacently arranged along the second passage B in a depth direction approximately orthogonal to the first passage A. Further, when two or more first passages A and two or more second passages B are arranged in orthogonal directions, two or more plant cultivation apparatuses 1 are placed in respective areas sectioned by the first passages A and the second passages B. The first passage A and the second passage B may each be provided with an air vent protective floor board 58. In the following description, the first passage A side viewed directly from the top of the plant cultivation apparatus 1 may be referred to as the front side.

The plant cultivation apparatus 1 described below is mainly used for hydroponic cultivation. Plants subject to being cultivated may be leaf vegetables; however, plants other than the leaf vegetables may also be subject to being cultivated.

The plant cultivation apparatus 1 includes a cultivation rack 2. The cultivation rack 2 includes a skeletal structure having columns 2a attached to a floor surface E at intervals in array along the first passage A. The columns 2a are placed in approximately vertical directions to the floor surface E. The columns 2a adjacently arranged in row directions along the second passage B are mutually supported in lateral directions via first beams 2b at several positions. The first beams 2b and the columns 2a are fixed with screws, rivets, or the like.

Second beams 2c arranged at intervals in height directions are bridged in lateral direction between the columns 2a arranged at opposing sides of the cultivation rack 2 in column directions along the first passage A as illustrated by an example viewed from the first passage A of the front view of FIG. 1. The columns 2a and the second beams 2c are fixed with screws, rivets, or the like. The cultivation trays 4 and the lighting devices 5 are attached to the second beams 2c in the height directions.

In FIG. 1, a structure having a cultivation unit 3 attached to the second beam 2c between the two columns 2a in an array along the first passage A is defined as the plant cultivation apparatus 1. As illustrated in FIG. 1, the first plant cultivation apparatus 1A and the second plant cultivation apparatus 1B are adjacently arranged along the second passage B, and the third plant cultivation apparatus 1C and the fourth plant cultivation apparatus 1D are adjacently arranged along the second passage B. Further, the first plant cultivation apparatus 1A and the third plant cultivation apparatus 1C are adjacently arranged along the first passage A, and the second plant cultivation apparatus 1B and the fourth plant cultivation apparatus 1D are adjacently arranged along the first passage A. In this case, the column 2a is shared between the plant cultivation apparatus 1A and the plant cultivation apparatus 1B (similarly, between the plant cultivation apparatus 1C and the plant cultivation apparatus 1D).

That is, FIG. 1 illustrates an example in which two plant cultivation apparatuses 1 are adjacently arranged along the first passage A, and another two plant cultivation apparatuses 1 are adjacently arranged along the second passage B while the columns 2a of the adjacent plant cultivation apparatuses 1 are connected via the first beams 2b. However, all the above-described plant cultivation apparatuses 1 may be defined as one plant cultivation apparatus 1. The number of columns 2a, the number of first beams 2b, and the number of second beams 2c to be included in the plant cultivation apparatus 1 may be appropriately determined according to the number of plants to be cultivated, the largeness of the space for accommodating the plant cultivation apparatus 1, the strength with respect to the weight including the plants and the devices to be placed, and the like.

FIG. 1 illustrates an example in which the columns 2a of two plant cultivation apparatuses 1, for example, the two plant cultivation apparatuses 1A and 1B adjacently arranged back to back along the second passage B are mutually connected via first beams 2b. These two plant cultivation apparatuses 1A and 1B may be defined as one plant cultivation apparatus 1. That is, one plant cultivation apparatus 1 may be defined as a combination of the plant cultivation apparatuses 1A and 1B. The number of columns 2a, the number of first beams 2b, and the number of second beams 2c to be included in one plant cultivation apparatus 1 may be appropriately determined according to the number of plants to be cultivated, the largeness of the space for accommodating the plant cultivation apparatus 1, the strength with respect to the weight including the plants and the devices to be placed, and the like.

Note that the first plant cultivation apparatus 1A and the second plant cultivation apparatus 1B adjacently arranged along the second passage B share the cultivation rack 2, and likewise, the third plant cultivation apparatus 1C and the fourth plant cultivation apparatus 1D adjacently arranged along the second passage B share the cultivation rack 2. Further, the first plant cultivation apparatus 1A and the third plant cultivation apparatus 1C adjacently arranged along the first passage A share the cultivation rack 2, and likewise, the second plant cultivation apparatus 1B and the fourth plant cultivation apparatus 1D adjacently arranged along the first passage A share the cultivation rack 2.

Next, the cultivation trays 4 and carrier devices 6 configured to carry the respective cultivation trays 4 are illustrated with reference to a front view of FIG. 2, and a perspective view of FIG. 3.

The cultivation tray 4 includes a horizontally long and U-shaped cultivation container 4a, and a plate-like lid 4b for covering an upper opening of the cultivation container 4a. The cultivation tray 4 is carried in or carried out the cultivation rack 2 using the carrier device 6.

The carrier device 6 is configured to slide on rails 7 bridged over the second beams 2c in the depth direction of the cultivation racks 2 adjacently arranged in the depth direction along the second passage B, and move in a front-back direction, that is, in the depth direction along the second passage B. Each of the rails 7 has a square cross section; and at least two rails 7 are arranged in parallel with each other on to the second beams 2c at intervals in a width direction. The carrier device 6, as illustrated in FIG. 3, is formed in a frame-like form having an approximately square planer shape, and includes slide parts 6a on two opposing sides of the carrier device 6. The slide parts 6a having L-shaped cross sections are linearly formed along the rails 7 to be fit in the corners formed of the upper surfaces and lateral surfaces of the rails 7.

The upper parts of the slide parts 6a on the two opposing sides of the carrier device 6 include respective parts on which the horizontally long cultivation trays 4 are respectively placed along the front end and the rear end of the carrier device 6. These parts are provided with two or more U-shaped container fitting parts 6b, in which the horizontally long cultivation trays 4 are fit, are formed at the front side and the rear side of the carrier device 6 viewed from the first passage A side. Accordingly, two or more cultivation trays 4 are located on and attached to the carrier device 6.

Further, one or more handles 6c may be attached to the front end of the carrier device 6 viewed from the first passage A. For example, the handles 6c are attached at intervals in a lateral direction. In addition, reinforcement beams 6d may be attached to parts toward the center of the frame-like carrier device 6.

When an operator places the cultivation tray 4 in the cultivation rack 2, the operator initially fits the plant S planted cultivation tray 4 into the container fitting parts 6b of the carrier device 6 from the upper side, and subsequently places the rear ends of the slide parts 6a of the carrier device 6 from the first passage A side on the rails 7 within the cultivation rack 2. The operator slides the slide parts 6a on the rails 7 by pushing the carrier device 6 with the operator's hands on the handles 6c of the carrier device 6, and stops the carrier device 6 at a set position. The operator thus ends attaching the cultivation tray 4 to the cultivation rack 2. On the other hand, when the operator takes the cultivation tray 4 out of the cultivation rack 2, the operator pulls the carrier device 6 toward the first passage A by gripping the handles 6c, slides the slide parts 6a of the carrier device 6 on the rails 7, and takes the cultivation trays 4 fit in the carrier device 6 out of the cultivation rack 2 of the plant cultivation apparatus 1 while supporting the carrier device 6.

Note that each of the plant cultivation apparatus 1A and the plant cultivation apparatus 1B may accommodate the cultivation units 3 in multiple stages such as seven stages in a height direction. In this case, it may be difficult for the operator standing on the floor E to handle the cultivation unit 3 placed on the upper stage in the depth direction. The operator may be able to move the positions of the cultivation trays 4 according to the kind of his or her work by making the cultivation trays 4 movable from the plant cultivation apparatus 1A.

The operator may put the cultivation tray 4 still remaining on the carrier device 6 in a cultivation rack of a different process apparatus or remove the cultivation tray 4 from the carrier device 6 for facilitating handling the plants. Note that an example of the different process apparatus may be a plant cultivation apparatus having a structure similar to that of the plant cultivation apparatus of the embodiment but use a different type of a liquid fertilizer to be supplied.

The use of the carrier device 6 configured to slide on the rails 7 disposed on the cultivation rack 2 enables the operator to handle two or more cultivation trays 4 simultaneously to improve the operator's work efficiency. In addition, the container fitting parts 6b in which the cultivation trays 4 are fitted are formed on the front side and the rear side of the carrier device 6 with intervals between the front side and the rear side. Thus, the cultivation trays 4 may be located easily while easily providing intervals between areas of the plants S subject to being cultivated.

Moreover, since increasing the number of the cultivation trays 4 with respect to the installation area of the plant cultivation apparatus 1 may enable increasing the number of the plants S subject to being cultivated, and eventually increasing the amount of harvesting plants, the first passage A and the second passage B will not be provided on opposing sides of each cultivation rack 2. That is, the two plant cultivation apparatuses 1A and 1B are adjacently placed back to back, and the first passage A is provided only in front of one of the plant cultivation apparatuses 1A and 1B with which the operator is working with, as illustrated in FIG. 1. In such a case, using the carrier device 6 having the above-described structure facilitates the operator's working on the cultivation trays 4 located at the back of the plant cultivation apparatus 1 as well as facilitating the operator's moving the cultivation trays 4.

Note that the carrier device 6 may be formed to have a size large enough to accommodate the respective cultivation trays 4 on the same level stages of the plant cultivation apparatuses 1A and 1B adjacently arranged in the depth direction, that is, in the direction along the second passage B of FIG. 1. For example, as illustrated in FIGS. 1 and 3, when two cultivation trays 4 are placed on one stage in the depth direction of each of the plant cultivation apparatuses 1A and 1B, and the plant cultivation apparatuses 1A and 1B are then connected, four cultivation trays 4 are placed on the same stage. Thus, the size of the carrier device 6 is increased in the depth direction compared to the example of FIG. 3, and the number of container fitting parts 6b is increased to enable one carrier device 6 to accommodate four cultivation trays 4.

Figure 3:
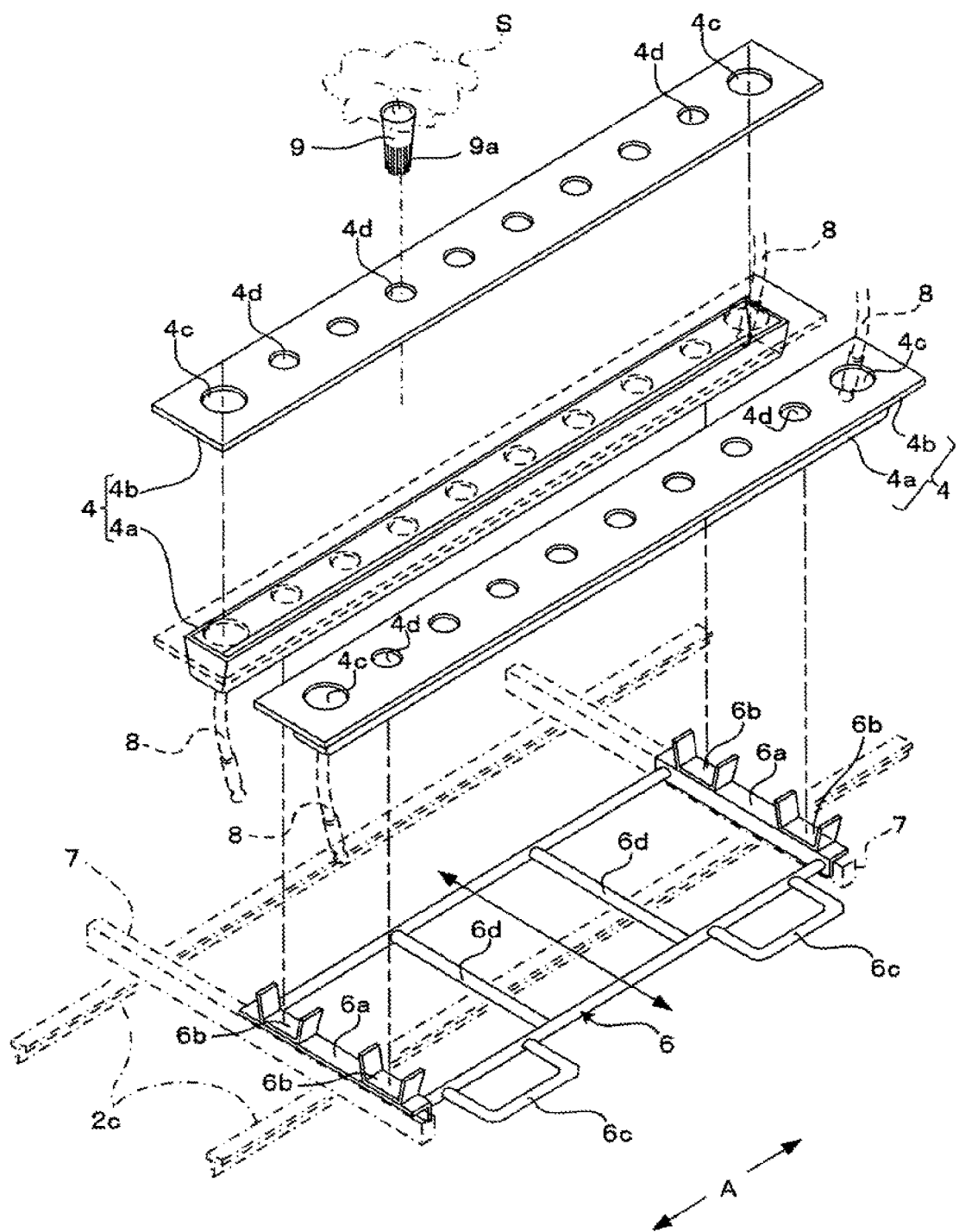
FIG. 3 is an exploded perspective view illustrating examples of a cultivation tray and a carrier device for the cultivation tray in the plant cultivation apparatus introduced in the plant cultivation system according to an embodiment.

In the example of FIG. 3, each of the cultivation trays 4 includes pot fitting holes 4d formed in a line for fitting cultivation pots 9; however, the cultivation tray 4 is not limited to this example. The carrier device 6 may receive a cultivation tray 4 having a longer length in depth direction to arrange the cultivation pots 9 in a matrix, and only one combination of container fitting parts may be disposed on the carrier device 6 for such a case.

The following illustrates the cultivation tray 4 having the above-described structure placed on the carrier device 6 with reference to FIGS. 1 to 4C.

Figure 4A:
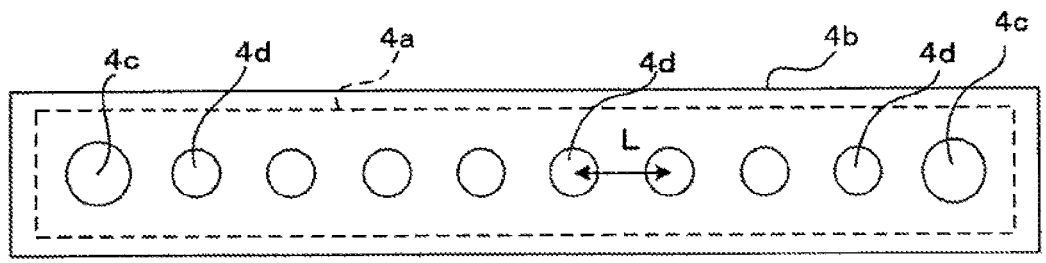
FIGS. 4A to 4C are plan views illustrating examples of a lid of the cultivation tray in the plant cultivation apparatus introduced in the plant cultivation system according to an embodiment.

As illustrated in FIGS. 3 and 4, hose fitting holes 4c are formed near opposing ends of the plate-like lid 4b for inserting liquid fertilizer hoses 8, respectively, and the pot fitting holes 4d for fitting the cultivation pots 9 are linearly formed at intervals in a longitudinal direction between the opposing ends of the plate-like lid 4b.

Note that it may be desirable to increase the number of plants growing in one cultivation tray 4 as many as possible in view of increasing the harvesting amount of plants. However, an appropriate width, for example, approximately 15 cm on the lid 4b between adjacent plants may be necessary for growing the plants, for example, leaf vegetables such as lettuce and Japanese mustard spinach, so as not to overlap grown leaves of the adjacent plants. The width between the adjacent plants may be appropriately determined according to kinds of the plants subject to being cultivated.

As already described above, the cultivation tray 4 includes the tub-like cultivation container 4a, and the lid 4b for covering an opening of the upper part of the cultivation container 4a, where the lid 4b includes the pot fitting holes 4d and the hose fitting holes 4c. The seedling plants S are placed in the respective cup-like cultivation pots 9, and the cultivation pots 9 are fitted into the pot fitting holes 4d. The edge of the upper part of each cultivation pot 9 is stuck with the edge of the corresponding pot fitting hole 4d. Hence, when the lid 4b is lifted, the cultivation pots 9 are also lifted.

Figure 4B:
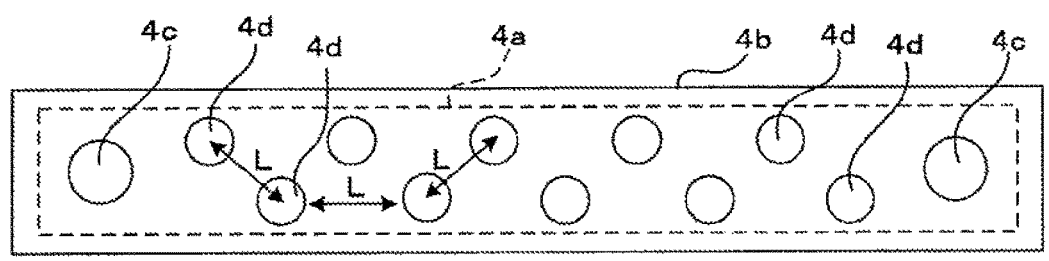
Figure 4C:
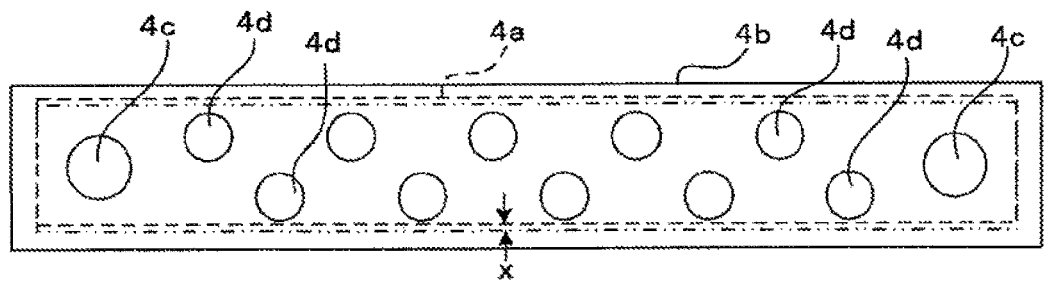

The pot fitting holes 4d formed in the lid 4b may be arranged in two or more lines in a zigzag configuration in a longitudinal direction, as illustrated in the plan view of FIG. 4B. In this case, the number of pot fitting holes 4d may be increased from 8 to 10 holes by setting a pitch L between the diagonally adjacent pot fitting holes 4d to the same pitch for arranging the pot fitting holes 4d in one line, and setting the pitch in each line of the pot fitting holes 4d to L or above. Further, the pot fitting holes 4d are arranged in two or more lines in the width direction. Hence, when the lid 4b in which the cultivation pots 9 are fitted is placed on the opening of the cultivation container 4a, the cultivation pot 9 or a root grown from the plant in the cultivation pot 9 interfere with the inner wall of the cultivation container 4a by a slightly misaligned amount x in the depth direction as illustrated in the example of FIG. 4C.

Accordingly, it may be unnecessary to provide a structure such as a projection or a step on the back of the lid 4b or the opening of the cultivation container 4a or for locating an interval between the lid 4b and the cultivation container 4a. This may prevent the following conditions in which the balance of the cultivation tray 4 while carrying the cultivation tray 4 may be lost due to the decentered gravity of the cultivation tray 4, or the lid 4b covering the cultivation pots 9 is misaligned so that the roots projected inside or outside the cultivation pots 9 are not in contact with the liquid fertilizer. In addition, the lid 4b may easily be located.

As illustrated in FIG. 3, the cultivation pot 9 includes a bottomed cylindrical configuration having an opening on the upper end of the cylinder, and having a tapered outer periphery with the width of the lower end being greater than the width of the upper end. The cultivation pot 9 includes a not-illustrated sponge serving as a cultivation medium in which a seedling plant S such as a seedling of lettuce raised in a predetermined period is planted. An example of the sponge may be a cubic urethane sponge. Further, vertically long slits 9a having the widths for allowing roots of the plants to project from the cultivation pot 9 are formed in the lower periphery of the cultivation pot 9 in a circumferential direction, and not-illustrated holes are formed in the bottom of the cultivation pot 9. Note that only one cultivation pot 9 is illustrated in the example of FIG. 3; however, two or more cultivation pots 9 are prepared when the plant cultivation apparatuses 1 are used.

Figure 5A:
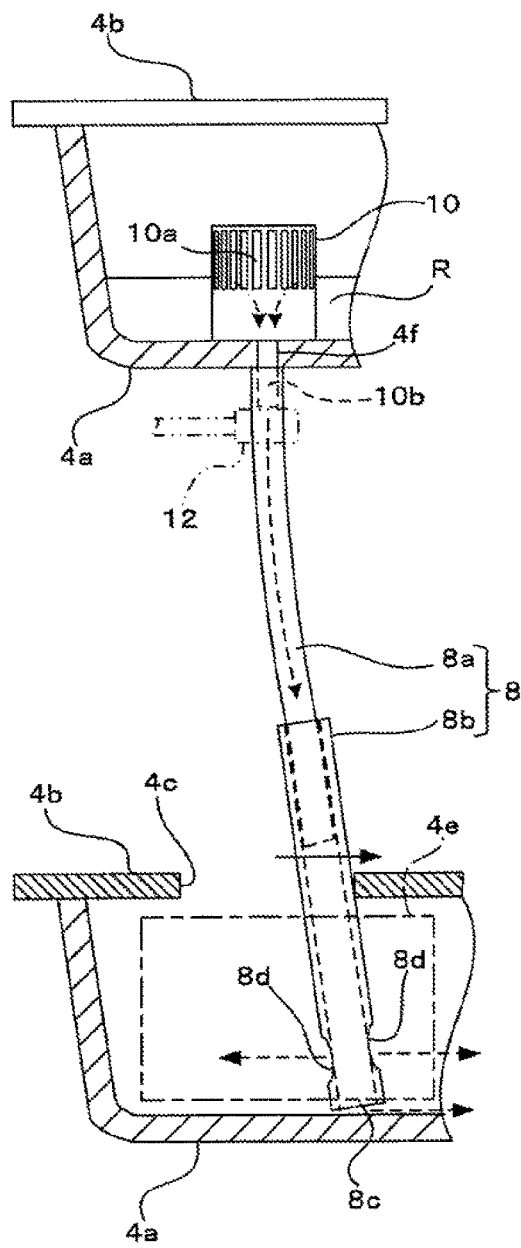
FIGS. 5A and 5B are front views illustrating examples of a liquid fertilizer hose reciprocally connected between the cultivation trays in the plant cultivation apparatus introduced in the plant cultivation system according to an embodiment.
Figure 5B:
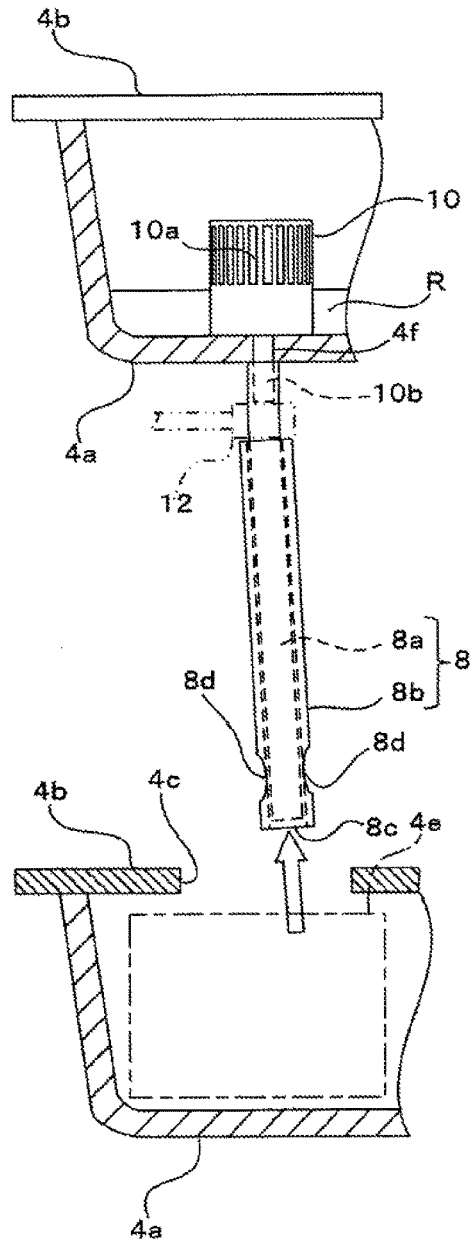

As illustrated by a cutout section indicated by a broken line in FIG. 2, and FIGS. 5A and 5B, the area near one end of the cultivation container 4a of the cultivation tray 4 serves as a liquid fertilizer introducing area 4e to which liquid fertilizer is supplied via the liquid fertilizer hose 8 fitted in the hose fitting hole 4c on one end of the lid 4b. Further, as illustrated by the cutout section of FIG. 2, and FIG. 5A, a liquid fertilizer discharging hole 4f is formed in the bottom on the other end of the lid 4b. A liquid volume adjuster 10 configured to adjust the liquid volume is attached to the liquid fertilizer discharging hole 4f and in the periphery of the liquid fertilizer discharging hole 4f so as not to allow the liquid fertilizer within the cultivation container 4a of the cultivation tray 4 to exceed the set height.

The liquid volume adjuster 10 has a funnel-like structure, and the liquid fertilizer discharging hole 4f at the bottom of the liquid volume adjuster 10 is provided with a downward extending tube-like leg 10b. The diameter of the upper end of the funnel-like liquid volume adjuster 10 is larger than the diameter of the leg 10b serving as a discharge port. Further, vertically long slits 10a are formed along a circumferential direction in the area exceeding the set height from the bottom of the liquid volume adjuster 10. Thus, the liquid fertilizer R that has reached the set height inside the cultivation container 4a of the cultivation tray 4 overflows and enters the liquid volume adjuster 10 via the vertically long slits 10a, and the entered liquid fertilizer R is discharged downward via the tube-like leg 10b beneath the cultivation container 4a.

The liquid fertilizer R normally flows in the cultivation tray 4 for cultivating plants with liquid fertilizer R, and the liquid fertilizer R discharged from the cultivation tray 4 of the upper stage is supplied to the cultivation tray 4 of the lower stage via the liquid fertilizer hose 8 to circulate the liquid fertilizer R between the cultivation trays 4 of the upper stages and the cultivation trays 4 of the lower stages.

The leaf vegetables such as lettuce and Japanese mustard spinach grown in a condition in which few bacteria exit such as a cleanroom are sufficiently clean such that edible parts of the leaf vegetables may be edible without being washed, compared to those grown in an unconfined space. On the other hand, the liquid fertilizer R may contain saprophytic bacteria originally contained in the waste product of the plants or fertilizer. Thus, in order to maintain the edible parts of the leaf vegetables to be sufficiently clean, it may be necessary to prevent the liquid fertilizer R from spattering over the leaves. Thus, the cultivation tray 4 is provided with the lid 4b configured to spatially separate the root desired to be in contact with the liquid fertilizer R and the leaves desired not to be in contact with the liquid fertilizer R.

On the other hand, the growing plants and the cultivation tray 4 as a whole needs to be moved by the carrier device 6 from the cultivation rack 2, as described above. For example, the cultivation tray 4 may be moved from one shelf to another for changing the kind of the liquid fertilizer R, or the cultivation tray 4 may be removed from the shelf for facilitating the operator's cultivating work on the plants.

It is not efficient to fix the liquid fertilizer hoses 8 to the cultivation tray 4 for allowing the cultivation tray 4 to be movable from the plant cultivation apparatus 1, and it may be preferable to easily separate the liquid fertilizer hoses 8 from the cultivation tray 4. Further, the liquid fertilizer R needs to be circulated between the cultivation trays 4 without spattering while the liquid fertilizer hoses 8 need to be easily removed from the cultivation trays 4 for removing the cultivation trays 4. In order to satisfy both the conditions, the liquid fertilizer hose 8 may preferably employ the following structure.

The liquid fertilizer hose 8 connected to the tube-like leg 10b of the liquid volume adjuster 10 includes a first upper hose 8a, a second lower hose 8b configured to be fitted movably in a vertical direction into the lower part of the first hose 8a, as illustrated in FIG. 5A. The inner diameter of the second hose 8b is larger than the outer diameter of the first hose 8a, allowing the first hose 8a to be inserted into the second hose 8b. Further, at least one liquid flow hole 8d penetrating a lateral part of the second hose 8b is formed in the lower part of the second hose 8b. The liquid flow hole 8d is open when the second hose 8b is extended from the first hose 8a and inserted into the cultivation tray 4 accommodated in the lower stage of the cultivation rack 2. The outer periphery of the first hose 8a is provided with an attaching part 12 for fixing the first hose 8a to the columns 2a.

In addition, at least the first hose 8a of the liquid fertilizer hoses 8 may have elasticity to be curved in an initial state, and may after being curved by external force, return to the initial state by releasing the external force. For example, when commercially available rubber hoses bundled in a circle are cut by the length of approximately 20 cm, the cut hoses are gently curved due to the curves developed by being bundled in the circle. The developed curves may be used as they are. The second hose 8b may be resistant to deformation or may be curved. When the second hose 8b is curved, the curvature of the second hose 8b may differ from the curvature of the first hose 8a. The first hose 8a and the second hose 8b may be formed of resin.

The upper end of the first hose 8a of the liquid fertilizer hoses 8 is fitted into the leg 10b of the liquid volume adjuster 10 in the cultivation tray 4. The second hose 8b extended downward from the first hose 8a is inserted in the hose fitting holes 4c of the cultivation tray 4 accommodated in the lower stage of the cultivation rack 2, and the second hose 8b in contact with the inner edge of the hose fitting holes 4c is curved in an amount of applying pressure to the lid 4b in the lateral direction.

The liquid fertilizer hose 8 connected to the leg 10b projected from the liquid fertilizer discharging hole 4f of the cultivation tray 4 is inserted into the hose fitting hole 4c of the lid 4b of a different cultivation tray 4 placed in the lower stage as illustrated in FIG. 5A. Hence, the lower end of the liquid fertilizer hose 8 is disposed in the liquid fertilizer introducing area 4e of the different cultivation tray 4. The liquid fertilizer R flowing from the upper cultivation tray 4 into the first hose 8a of the liquid fertilizer hose 8 is discharged from an opening 8c in the lower end of the second hose 8b. Note that when the lower end of the second hose 8b is in contact with the bottom of the liquid fertilizer introducing area 4e, the liquid fertilizer R may become difficult to flow from the opening 8c at the lower end of the second hose 8b. However, the liquid fertilizer R flows from the liquid flow hole 8d in the lower lateral part of the second hose 8b, and hence the liquid fertilizer R is efficiently supplied to the liquid fertilizer introducing area 4e. The curved liquid fertilizer hose 8 is in contact with the edge of the hose fitting holes 4c of the lid 4b of the cultivation tray 4 to restrict the movement of the liquid fertilizer hose 8. Hence, operations such as fixing the lower end of the liquid fertilizer hose 8 with a member or removing the lower end of the liquid fertilizer hose 8 may become unnecessary.

The liquid fertilizer hose 8 has an extendable structure in a longitudinal direction, which may facilitate inserting the liquid fertilizer hose 8 into the hose fitting holes 4c. The structure of the liquid fertilizer hose 8 is not limited to the extentdable structure. The liquid fertilizer hose 8 may be formed of a tube partially having an accordion structure capable of being folded in the longitudinal direction. When the liquid fertilizer hose 8 partially having the accordion structure is employed, the movement of the liquid fertilizer hose 8 may be restricted by hooking the edge of the hose fitting holes 4*c* on the recess part of the accordion structure. The cultivation trays 4 are connected in series by the liquid fertilizer hoses 8 in a longitudinal direction. Thus, one liquid fertilizer hose 8 is connected from a first end of the upper tray cultivation tray 4 to a first end the middle cultivation tray 4, and another liquid fertilizer hose 8 is connected from a second end of the middle cultivation tray 4 to a second end of the lower cultivation tray 4.

To remove the cultivation trays 4 from the cultivation rack 2, the liquid fertilizer R is stopped being supplied to the cultivation tray 4, the second hose 8*b* of the liquid fertilizer hose 8 slides in the upper direction to be removed from the lid 4*b* while no the liquid fertilizer R flows into the liquid fertilizer hose 8. When the second hose 8*b* slides along the outer periphery of the first hose 8*a*, friction generated by the contact between the first hose 8*a* and the second hose 8*b* is increased due the difference in curvature between the elastic first hose 8*a* and the second hose 8*b*. Hence, it may be difficult to cause the second hose 8*b* to deviate from the first hose 8*a*. Subsequently, the first hose 8*a* is disconnected from the liquid volume adjuster 10. When the second hose 8*b* slides and closes the liquid flow hole 8*d* in the lateral part of the second hose 8*b*, the leaking direction of the liquid fertilizer R that leaks from the liquid volume adjuster 10 is limited to a direction toward the opening 8*c*. Hence, the scattering of the liquid fertilizer R may be prevented.

The liquid flow hole 8*d* may be formed in the upper lateral part of the second hose 8*b*, which enables the first hose 8*a* to fit in the second hose 8*b* without selecting a direction of the second hose 8*b* to improve the operator's workability. Note that the liquid flow hole 8*d* formed in the upper end part of the second hose 8*b* is closed by the first hose 8*a* when the liquid fertilizer hose 8 is extended for supplying the liquid fertilizer R as illustrated in FIG. 5A, or the liquid fertilizer supply is stopped and the liquid fertilizer hose 8 is removed from the lower cultivation tray 4 as illustrated in FIG. 5B.

Figure 6A:
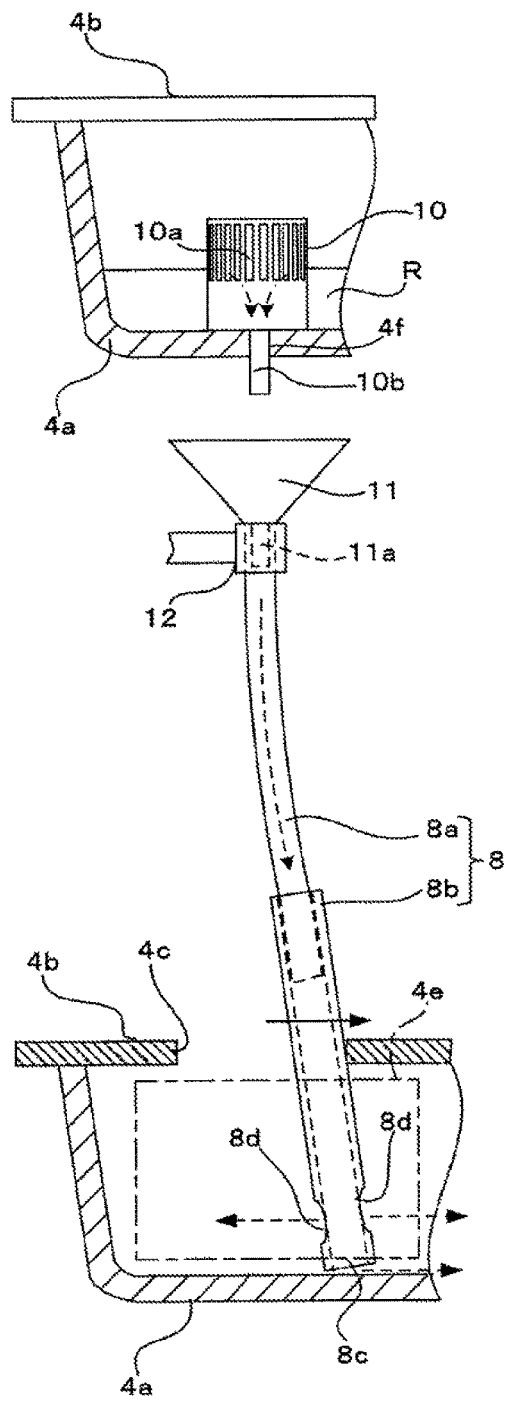
FIGS. 6A and 6B are front views illustrating modifications of the liquid fertilizer hose reciprocally connected between the cultivation trays in the plant cultivation apparatus introduced in the plant cultivation system according to an embodiment.
Figure 6B:
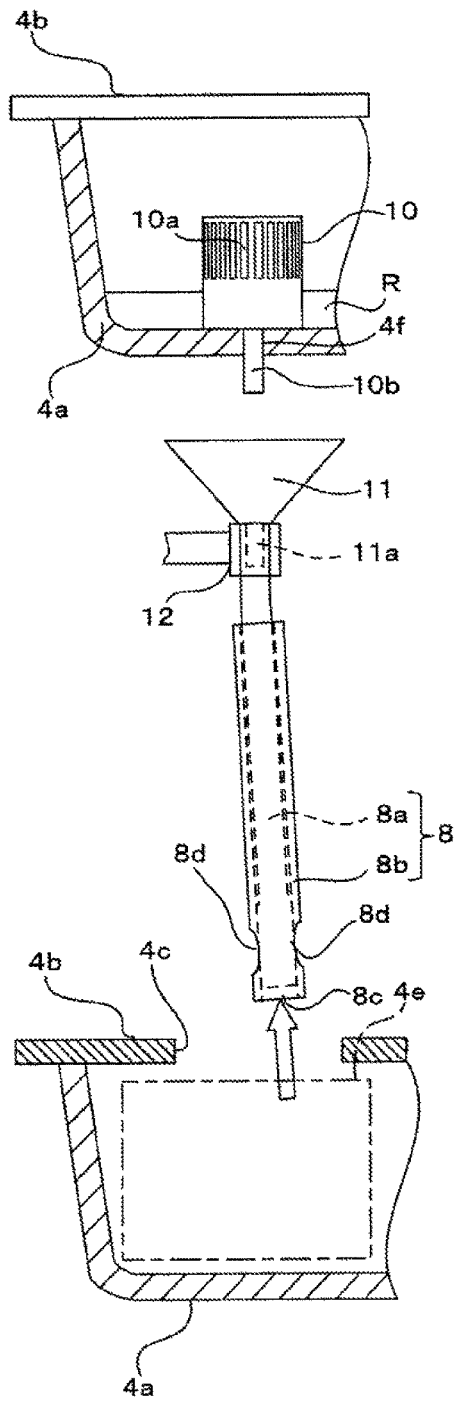

Note that the liquid fertilizer hose 8 illustrated in FIGS. 5A and 5B has a structure in which an upper end of the liquid fertilizer hose 8 is connected to the tube-like leg 10*b* of the liquid volume adjuster 10; however, the liquid fertilizer hose 8 is not limited to this structure. For example, as illustrated in FIGS. 6A and 6B, the liquid fertilizer hose 8 may have a structure in which an upper end of the liquid fertilizer hose 8 is connected to a leg 11*a* of a funnel container 11. An example of the funnel container 11 may be a vinyl chloride tube. The leg 11*a* of the funnel container 11 is connected to the upper end of the first hose 8*a*, and the attaching part 12 for connecting the first hose 8*a* to the columns 2*a* is attached to a periphery of a connected part. The funnel container 11 above the liquid fertilizer hose 8 having such a structure is disposed immediately beneath the tube-like leg 10*b* of the liquid volume adjuster 10 within the cultivation container 4*a* of the cultivation tray 4.

According to the liquid fertilizer hose 8 having the above structure, even when the leg 10*b* is spatially separate from the upper end of the liquid fertilizer hose 8 or the funnel container 11, the leg 10*b* may be substantially in a connected state with the upper end of the liquid fertilizer hose 8 or the funnel container 11; that is, the liquid fertilizer R flowing from the leg 10*b* is directed to the liquid fertilizer hose 8 without leakage. Accordingly, when the cultivation trays 4 are transferred by the carrier device 6, the operator does not need to connect the liquid fertilizer hose 8 to the liquid volume adjuster 10 or disconnect the liquid fertilizer hose 8 from the liquid volume adjuster 10, which may improve the operator's work efficiency.

Moreover, the first hose 8*a* of the liquid fertilizer hose 8 may be integrated with the funnel container 11. In this case, the liquid fertilizer hose 8 includes a first hose 8*a* having a fennel-shaped upper end and a second hose 8*b*, and does not include the funnel container 11. In other words, the leg 11*a* of the funnel container 11 is extended long and connected to the second hose 8*b*. When the leg 11*a* of the funnel container 11 is extended long, the first beams 2*b* is fitted movably in a vertical direction into the lower outlet part of the funnel container 11. The inner diameter of the second hose 8*b* is larger than the outer diameter of the leg 11*a* of the funnel container 11, allowing the outlet part of the funnel container 11 to be inserted into the second hose 8*b*. Alternatively, the funnel container 11 may be integrated with the accordion structured liquid fertilizer hose 8 such that the accordion structured liquid fertilizer hose 8 as a whole forms the funnel structure that has the opening diameter of the upper end is larger than the opening diameter of the lower end. In any case, the opening diameter of the upper end of the funnel container 11 or the opening diameter of the liquid fertilizer hose 8 integrated with the funnel container 11 is configured to be larger than the opening diameter of the leg 10*b* of the liquid volume adjuster 10, which enables the upper end of the funnel container 11 or the liquid fertilizer hose 8 integrated with the funnel container 11 to receive the liquid fertilizer R flown from the leg 10*b* without any spill or leakage.

The cultivation trays 4 placed on the carrier device 6 are disposed in multiple stages at vertical intervals within the plant cultivation apparatus 1; however, the directions of the vertically adjacent cultivation trays 4 are reversed such that positions of the liquid fertilizer introducing area 4*e* and the liquid volume adjuster 10 in the upper cultivation tray 4 are horizontally reversed from the positions of the liquid fertilizer introducing area 4*e* and the liquid volume adjuster 10 in the immediately lower cultivation tray 4, as illustrated in FIG. 2. That is, the positions of the liquid fertilizer introducing area 4*e* and the liquid volume adjuster 10 in the cultivation tray 4 are the same in every other stage. The liquid fertilizer R is supplied from a not-illustrated liquid fertilizer supply device via the liquid fertilizer hose 8 to the liquid fertilizer introducing area 4*e* of the cultivation tray 4 in the uppermost stage. The liquid fertilizer R supplied that has reached the set height leaks through the slits 10*a* of the liquid volume adjuster 10 toward the leg 10*b* beneath the slits 10*a*, and is then supplied to the liquid fertilizer introducing area 4*e* of the cultivation tray 4 in the lower stage through the liquid fertilizer hose 8 connected to the leg 10*b*. As described above, the liquid fertilizer R is supplied to the plants S growing in the cultivation pots 9 fitted in the cultivation trays 4 disposed in the multiple stages in the order from the upper to lower stages via the liquid fertilizer hose 8. Hence, the liquid fertilizer R is constantly replaced with the liquid fertilizer R having sufficient nutrition to be supplied to the plants S in the cultivation trays 4 disposed in the multiple stages.

Note that the leg 10*b* of the liquid volume adjuster 10 in the cultivation tray 4 disposed in the lowermost stage is, as illustrated in FIG. 2, substantially connected within an opening 14*a* of a drainage collecting tube 14 via a relay tube 13. The collected liquid fertilizer R is treated in a not-illustrated regeneration treatment device, and the treated liquid fertilizer R is then supplied as a liquid fertilizer R to the cultivation tray 4 in the uppermost stage.

Note that the types of the liquid fertilizer R supplied to the plants S may be changed according to various growth stages of plants S. In this case, a hydroponic cultivation system may include two or more the plant cultivation apparatuses 1 of the embodiment, and components of the liquid fertilizer R supplied may be differentiate between the two plant cultivation apparatuses 1, thereby implementing the hydroponic cultivation system capable of supplying, for example, a first liquid fertilizer R to the fastest growing plants S, and a second liquid fertilizer R to the next fastest growing plants S. For example, it may be possible to implement a hydroponic cultivation system capable of supplying the first liquid fertilizer R in the former half of the planting period, and the second liquid fertilizer R in the latter half of the planting period. Further, the plants S in the cultivation rack 2 of the first plant cultivation apparatus 1A may grow at timing differing from a timing at which the plants S grows in the cultivation rack 2 of the second plant cultivation apparatus 1B in a growth period of a plant.

That is, it may be possible to implement a hydroponic cultivation system having the first plant cultivation apparatus 1A connected to a first liquid fertilizer supply system and the second plant cultivation apparatus 1B connected to a second liquid fertilizer supply system. The components of the first liquid fertilizer may differ from the components of the second liquid fertilizer. One of the first liquid fertilizer and the second liquid fertilizer may be water. Examples of water include tap water and underground water. In this case, the plants S in the cultivation tray 4 grown by the first plant cultivation apparatus 1A may need to be transferred to the second plant cultivation apparatus 1B. According to the embodiment, the cultivation trays 4 may be easily movable between the first plant cultivation apparatus 1A and the second plant cultivation apparatus 1B to which different component liquid fertilizers are supplied, the components of the liquid fertilizer supplied to one plant S may be changed.

In this hydroponic cultivation system, the first plant cultivation apparatus 1A connected to a first liquid fertilizer supply path 31 and the second plant cultivation apparatus 1B connected to a second liquid fertilizer supply path 32 are disposed back to back, and the first passage A is sandwiched between the first plant cultivation apparatus 1A and the second plant cultivation apparatus 1B. FIG. 7 illustrates a conceptual diagram of the hydroponic cultivation system having the above-described arrangement from a lateral view.

In this case, the cultivation trays 4 disposed in multiple stages are mutually connected in series with the first liquid fertilizer supply path 31 via the liquid fertilizer hose 8 in the first plant cultivation apparatus 1A, as described above. Further, the cultivation trays 4 disposed in multiple stages are mutually connected in series with the second liquid fertilizer supply path 32 via the liquid fertilizer hose 8 in the second plant cultivation apparatus 1B.

As illustrated in FIG. 7, as a combination of the first plant cultivation apparatus 1A and the second plant cultivation apparatus 1B to which liquid fertilizers having different components are supplied, two or more combinations of the first plant cultivation apparatus 1A and the second plant cultivation apparatus 1B are disposed. The operator standing in the first passage A takes the cultivation trays 4 alone or the carrier device 6 with the cultivation trays 4 thereon from the first plant cultivation apparatus 1A connected to the first liquid fertilizer supply path 31. The operator turns the direction of his or her body D to move the cultivation trays 4 to the second plant cultivation apparatus 1B connected to the data display processor 32, and attach the cultivation trays 4 to the second plant cultivation apparatus 1B, thereby ending the change of the liquid fertilizer to be supplied to the plants S.

That is, the operator may simply turn the direction of his or her body by holding the carrier device 6 with the cultivation trays 4 thereon, or the cultivation trays 4 alone while the operator stands approximately the same position to change liquid fertilizer. Hence, the operators work efficiency may be improved. In this case, the same lateral side of the carrier device 6 may face the first passage A before and after the transfer of the carrier device 6. Further, the operator may be able to simultaneously move the cultivation trays 4 from the first plant cultivation apparatus 1A to the second plant cultivation apparatus 1B by one translocating operation of the carrier device 6 with the cultivation trays 4 thereon. Accordingly, the operator's work efficiency may be improved. The efficiency obtained by reducing working time owing to the efficient work of changing the liquid fertilizers may be improved as the number of plants subject to being cultivated increases.

The example of FIG. 7 illustrates a conceptual diagram of the hydroponic cultivation system in which the operator transfers the cultivation trays 4 between the two plant cultivation apparatuses 1; however, the cultivation trays 4 may be transferred by a machine instead of the operator.

In the plant cultivation apparatus 1, the cultivation trays 4 are disposed at intervals in a vertical direction, the liquid fertilizer hose 8 is inserted in the liquid fertilizer introducing areas 4e through the hose fitting holes 4c of the cultivation trays 4, and the cultivation pots 9 are fitted in the pot fitting holes 4d of each of the cultivation trays 4. To change the liquid fertilizer hose 8 connected to the first liquid fertilizer supply path 31 in the cultivation tray 4 with the liquid fertilizer hose 8 connected to the data display processor 32, the liquid fertilizer hose 8 connected to the data display processor 32 is inserted into the same liquid fertilizer introducing area 4e of the cultivation tray 4. The plants S obtained after the process of raising seedlings may be planted in not-illustrated sponges within the respective cultivation pots 9. The plants S need to have sufficient light to photosynthesize for growing. Thus, it may be preferable to change the distance between the lighting device 5 and the plants S according to the growth of the plants S.

Figure 8A:
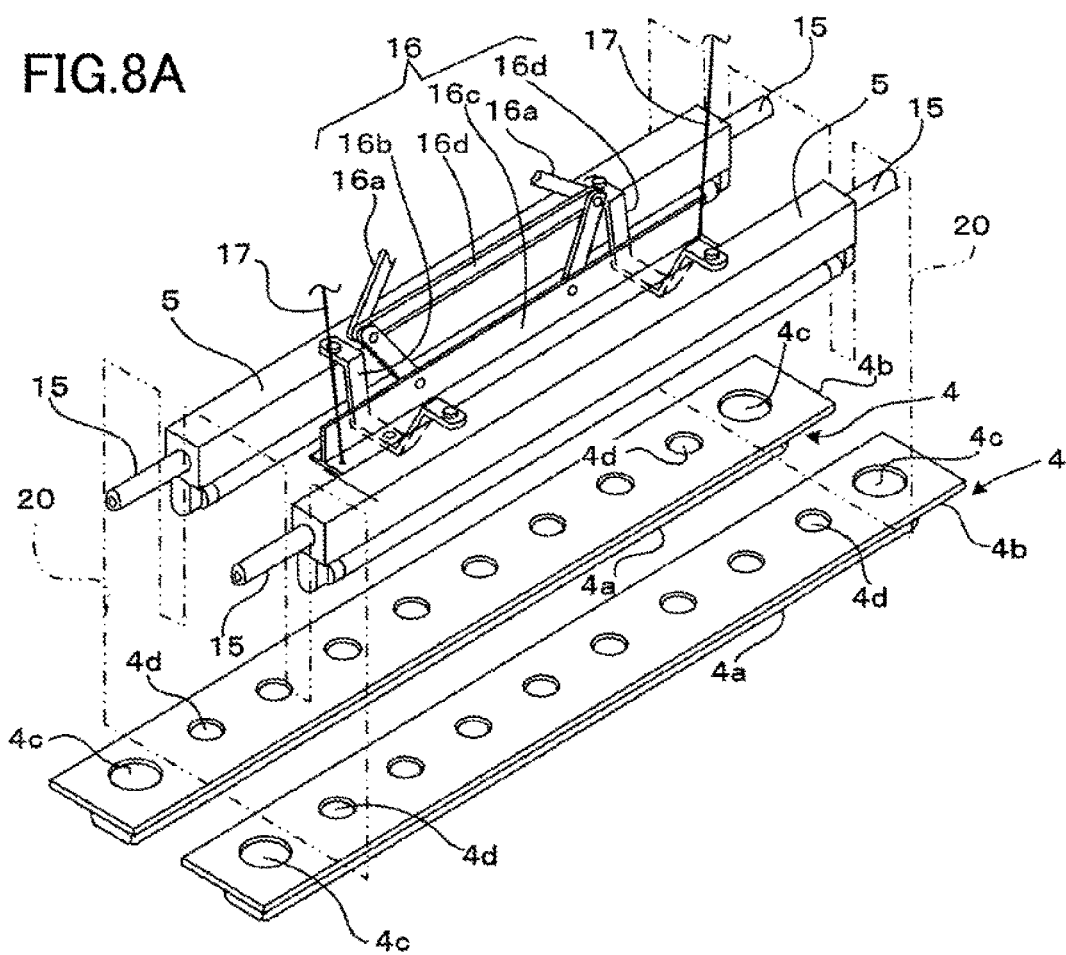
FIGS. 8A and 8B are perspective views illustrating examples of the cultivation trays, a lighting device, a lighting device lift, and a light reflector in the plant cultivation apparatus introduced in the plant cultivation system according to an embodiment.

The lighting device 5 has an oblong shape along the cultivation tray 4 as illustrated in the front view of FIG. 2 and the perspective view of FIG. 8A, and may have a straight tube-shaped fluorescent lamp or linearly aligned illuminating lamps, to one end or opposing ends of which an electricity supply wiring cable 15 is connected. The lighting device 5 is attached to a web of a second beam 2c via a lift 16. The lift 16 includes multiple folding arms 16a upper ends of which are pivotally supported on the web of the second beam 2c having a T-shaped cross section to be retractable in a vertical direction. The middle foldable parts of the multiple arms 16a are pivotally connected with one another via a beam 16b. Lower ends of the 16a are pivotally supported by a plate 16c having a reverse T-shaped cross section.

Supports 16d for supporting the lighting devices 5 from a front side and a rear side of the lighting devices 5 are attached to a lower end of the plate 16c. The supports 16d may each have a recess part formed in the middle, such that the plate 16c is fixed within the recess part with screws, rivets or the like. Hence, the plate 16c is located between the two lighting devices 5 to reduce the distance between the lighting devices 5 and the second beam 2c. Further, wires 17 that are drawn upward are attached near opposing ends of the plate 16c. The wires 17 are connected to respective ends of a coil spring 19 via pulleys 18 pivotally attached to the web of the second beam 2c, and hence the wires 17 are pulled upward by force not to fall downward.

The lighting devices 5 attached to the lift 16 movably in the vertical direction may be able to change the height of the lighting devices 5 according to the growth of the plants S as well as facilitating the operator's work such as putting the cultivation trays 4 in the plant cultivation apparatus 1 or removing the cultivation trays 4 from plant cultivation apparatus 1 by lifting the lighting devices 5 up high.

It may be preferable to apply artificial light multidirectionally from the top to a plant except from the ground in order to cultivate one plant with minimum developmental difference in leaves of the plant such as coloring. The above-described skeletal structure of the rack 2 may improve air circulation to maintain suitable temperatures; however, this skeletal structure of the rack 2 may allow artificial light generated from the lighting devices 5 to pass through space between the columns 2a, first beams 2b, and second beams 2c to diffuse. Hence, it may be preferable to dispose light reflection members around the cultivation rack 2 so as to reflect light back to the plant without diffusing. Thus, a preferable light reflector (light reflection part) 20 may be configured to reflect light generated from the illumination back to the plant and have the following structure.

The light reflector 20 is disposed at an upper side of the cultivation tray 4 and outside an area of the cultivation tray 4 where the pot fitting holes 4d are formed when the cultivation tray 4 is accommodated inside the plant cultivation apparatus 1. The light reflector 20 may be formed of glass, mirror made of a silver film, or a mirror finishing metallic plate; however, it may be sufficient to form the light reflector 20 of a white plate with glossy surfaces such as a white polyvinyl chloride plate. The light reflector 20 is disposed to make light intensity approximately uniform on the cultivation tray 4 that receives light from the lighting device 5. That is, the plants S grow in the cultivation pots 9 arranged below the opposing ends of the lighting device 5, and the light reflector 20 is disposed to allow the plants S below the opposing ends of the lighting device 5 to receive reflection light reflected from the light reflector 20. Thus, the light intensity distribution on the cultivation tray 4 may be approximately uniform, and the plants S may grow under approximately the same conditions regardless of the positions of the cultivation pots 9.

Further, as illustrated in 8B, vertically long slits 20s are formed in an upper part of the light reflector 20 to pass the projected wiring cable 15 connected to the opposing ends of the lighting device 5 through the slits 20s. The number of slits 20s may be determined according to the number of lighting devices 5. In the example of FIG. 7, there are two lighting devices 5 with respect to one light reflector 20, and hence, two slits 20s are formed in the light reflector 20. The lengths of the slits 20s may be determined with respect to a movable range of the lighting device 5 in a vertical direction. Note that when the lighting device 5 is a fluorescent lamp, a reflecting mirror 23 is disposed over a fluorescent tube 5a, as illustrated in FIG. 2. As illustrated in FIG. 2, the reflecting mirror 23 forms a bag-like shape to enclose the fluorescent tube 5a, and includes a reflection surface at the upper side and a transparent film at the lower side. In addition, a clip 24 may be used for fixing the saclike reflecting mirror 23 to the fluorescent tube 5a.

The above-described structure of the plant cultivation apparatus 1 may allow the operator to attach such removable light reflector 20 at the end of the operator's work. That is, the light reflectors 20 may be attached to the plant cultivation apparatus 1 after the operator's work such as placing the cultivation trays 4 within the frame-like rack 2, attaching the liquid fertilizer hoses 8, and checking the positions of the cultivation trays 4 and the liquid fertilizer hoses 8 by viewing from the second passage B. The slits 20s formed in the light reflectors 20 may also serve as air circulation passages to allow the air passing through the space between the lighting devices 5 and the cultivation trays 4 to the second passage B.

Figure 8B:
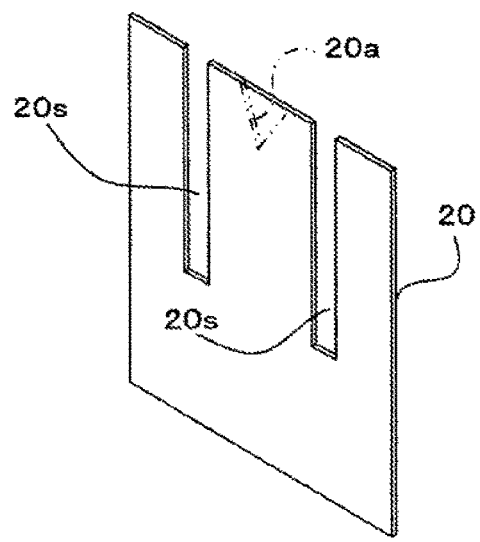

As illustrated by a dashed-two dotted line in FIG. 8B, a notch 20a may be formed in the center of the upper end of the light reflector 20 to allow a part of the second beam (supporting member) 2c for supporting the lighting device 5, or a part of the lift to be fitted in the notch 20a. The light reflector 20 may be expanded in a height direction by forming such a notch 20a in the light reflector 20 to increase an amount of light reflected to the plants S.

Figure 9A:
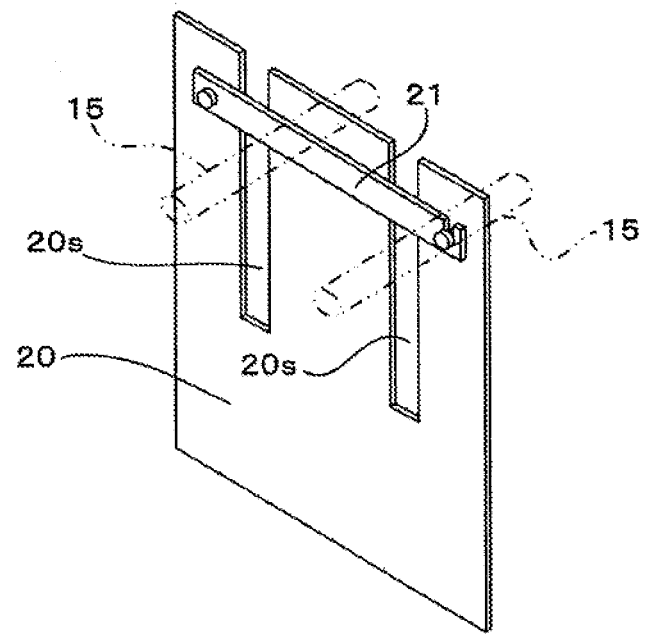
FIG. 9A is a perspective view illustrating a modification of the light reflector in the plant cultivation apparatus introduced in the plant cultivation system according to an embodiment.

As illustrated in the example of FIG. 9A, a removable hanger 21 crossing over upper parts of the slits 20s of the light reflector 20 may be attached to the light reflector 20. Note that FIG. 9A illustrates an example of a plate-like hanger 21; however, the hanger 21 is not limited to the plate-like configuration, and may have a string-like configuration. The hanger 21 may have any shape other than the plate-like or the string-like configuration insofar as the hanger 21 may hang the light reflector 20 with the wiring cables 15. In this structure, the hanger 21 hangs the wiring cables 15 of the lighting device 5 to lift the light reflector 20 together with the lighting device 5 when the position of the lighting device 5 is moved up high.

Figure 9B:
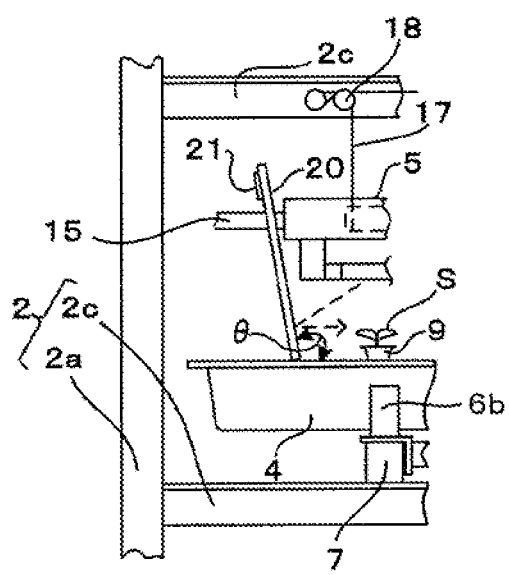
FIGS. 9B and 9C are front views illustrating operations of modifications of the light reflector and the lighting device in the plant cultivation apparatus introduced in the plant cultivation system according to an embodiment.

For example, when the plants S planted in the cultivation tray 4 are small, the light reflector 20 is inclined to form an angle θ of 90 degrees or more between the lid 4b of the cultivation tray 4 and the light reflector 20 within an area in which the plants S are planted, as illustrated in FIG. 9B. This may adjust light applied from the lighting device 5 diagonally downward toward outside to reflect in a lateral direction.

Figure 9C:
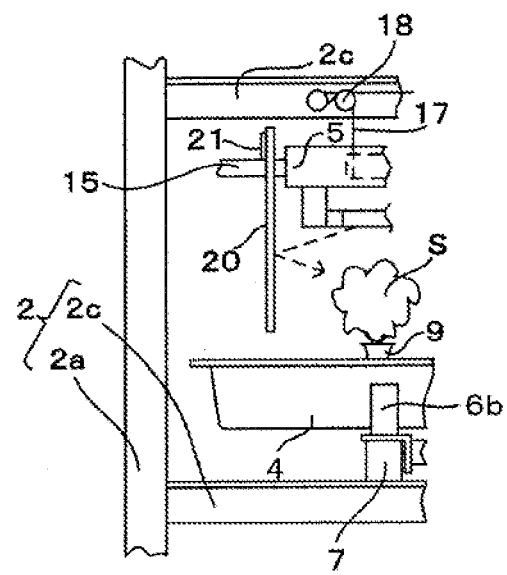

As illustrated in FIG. 9C, appropriate distances may be obtained by increasing intervals between the lighting devices 5 and the cultivation trays 4 as the plants S grow and heights of the plants S increase. In this case, the light reflector 20 may be lifted upright by raising the position of the lighting device 5 via the hanger 21 from which the wiring cables 15 hang. Thus, light may be reflected by the light reflector 20 above the plant's leaves grown upward to optimize the amount of light applied to the plants S. In this case, the degraded air circulation due to an increase in the number of leaves of the plants S and the growth of the plants S may be improved by forming a gap between the lower end of the light reflector 20 and the cultivation tray 4.

In the plant cultivation apparatus 1 described above, the cultivation pots 9 that contain sprouting plants S planted in the not-illustrated sponge are fitted in the pot fitting holes 4d of the cultivation tray 4 first. Subsequently, the cultivation tray 4 is fitted into the container fitting parts 6b of the carrier device 6. Further, the slide parts 6a on the opposing sides of the carrier device 6 are placed on the rails 7 within the cultivation rack 2, and the carrier device 6 is placed within the cultivation rack 2 by the above-described operation. In this case, the liquid volume adjuster 10 attached to the lowest position in the cultivation tray 4 is connected via the relay tube 13 in the opening 14a of the drainage collecting tube 14. Further, the horizontal positions of the liquid fertilizer introducing area 4e and the liquid volume adjuster 10 in the lower cultivation tray 4 are reversed from the horizontal positions of the liquid fertilizer introducing area 4e and the liquid volume adjuster 10 in the immediately upper cultivation tray 4.

After disposing the cultivation trays 4 as described above, the upper end of the liquid fertilizer hose 8 that is substantially connected to the leg 10b of the liquid volume adjuster 10 in the upper cultivation tray 4 may be extended by changing the length of the liquid fertilizer hose 8. For example, the second hose 8b that is drawn downward from the curved first hose 8a is inserted in the hose fitting hole 4c of another cultivation tray 4 on the lower stage. In this case, the liquid flow hole 8d provided in the lower lateral part of the second hose 8b is adjusted so as not to be closed by the first hose 8a. Note that the liquid fertilizer hose 8 communicating with a supply port of the liquid fertilizer supply device (not illustrated) is substantially connected to the hose fitting holes 4c of the cultivation tray 4 on the uppermost stage.

Thereafter, the wiring cables 15 of the lighting device 5 pass through the slits 20s of the light reflector 20, and the lower end of the light reflector 20 is placed on the cultivation tray 4. Subsequently, the height of the lighting device 5 is adjusted by the lift 16. Further, the angle or the like of the light reflector 20 is adjusted.

Further, the liquid fertilizer R is supplied from the liquid fertilizer supply device to the liquid fertilizer introducing area 4e within the cultivation tray 4 on the upper most stage via the liquid fertilizer hose 8. Hence, the volume of the liquid fertilizer R is increased within the cultivation tray 4 to reach the vertically long slits 10a of the liquid volume adjuster 10, and the liquid fertilizer R passing through the vertically long slits 10a is supplied via the liquid fertilizer hose 8 into an inside of the liquid fertilizer introducing area 4e of another cultivation tray 4 on the immediately lower stage. When the supplied liquid fertilizer R in another cultivation tray 4 reaches the vertically long slits 10a of the liquid volume adjuster 10, the liquid fertilizer R is supplied via the liquid fertilizer hose 8 to still another cultivation tray 4 on the further lower stage. The liquid fertilizer R thus supplied is discharged to the drainage collecting tube 14 via the liquid volume adjuster 10 of the cultivation tray 4 on the lowest stage, and the discharged liquid fertilizer R is then reprocessed and further transferred to the liquid fertilizer supply device.

When this kind of liquid fertilizer circulation is performed within set days, the plants S that absorb nutrition from the liquid fertilizer R and are exposed light applied from the lighting device 5 grow. The height of the lighting device 5 is changed by the lift 16 in accordance with the growth of the plants S. When the set days have elapsed, the cultivation trays 4 are transferred from the plant cultivation apparatus 1 to another apparatus having a different environment in order to place the plants S in the cultivation trays 4 under the different environment.

To remove the cultivation trays 4, the operator initially stops the liquid fertilizer supplied from the liquid fertilizer supply device, checks whether the liquid fertilizer R no longer flows through the liquid fertilizer hose 8, and shortens the length of the liquid fertilizer hose 8. For example, the operator slides the second hose 8b on the first hose 8a to push up the second hose 8b. In this case, the liquid flow hole 8d provided in the lower lateral part of the second hose 8b may be closed by the first hose 8a. Further, the operator may stop emission of the lighting device 5. Subsequently, the operator removes the liquid fertilizer hose 8 from the hose fitting hole 4c of the cultivation tray 4. The operator then draws the carrier device 6 toward the first passage A by sliding the carrier device 6 on the rails 7, removes the cultivation trays 4 on the carrier device 6 from the plant cultivation apparatus 1, relocates the carrier device 6 with the cultivation tray 4 on in another apparatus.

The light reflector 20 placed on the cultivation tray 4 may be removed from the cultivation tray 4 before or after the liquid fertilizer hose 8 is removed from the cultivation tray 4 to facilitate the operator's work. Note that the light reflector 20 may be set against the columns 2a of the cultivation rack 2 or the second beam 2c of the cultivation rack 2.

According to the embodiment, the cultivation tray 4 may be easily placed on the plant cultivation apparatus 1 or removed from the plant cultivation apparatus 1 to facilitate the operator's work efficiency.

FIGS. 10A, 10B, 11A, and 11B illustrate a cleanroom and an air-conditioning unit in the plant cultivation system according to the embodiment. The cleanroom includes the two or more plant cultivation apparatuses 1 described above. The plant cultivation apparatus 1 may include the cultivation rack 2 for hydroponically cultivating plants as described above.

Figure 10A:
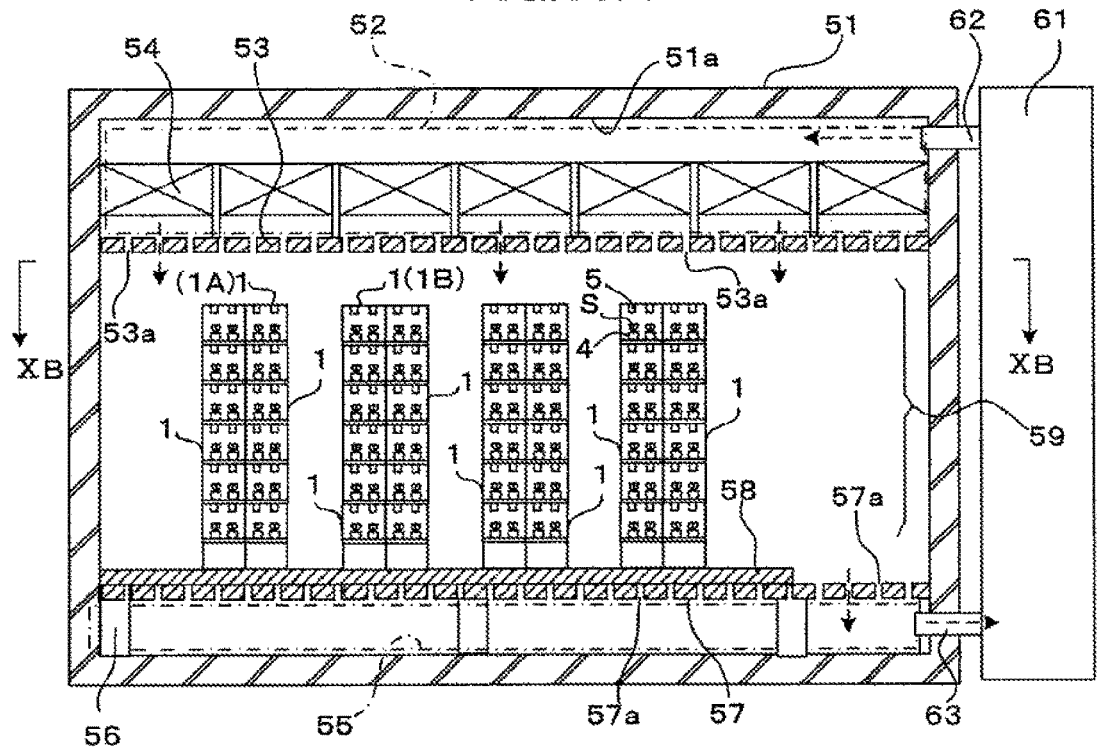
FIGS. 10A and 10B are is a sectional side view and a sectional plan view illustrating a first outlined configuration example of the plant cultivation apparatus introduced in the plant cultivation system according to an embodiment.
Figure 10B:
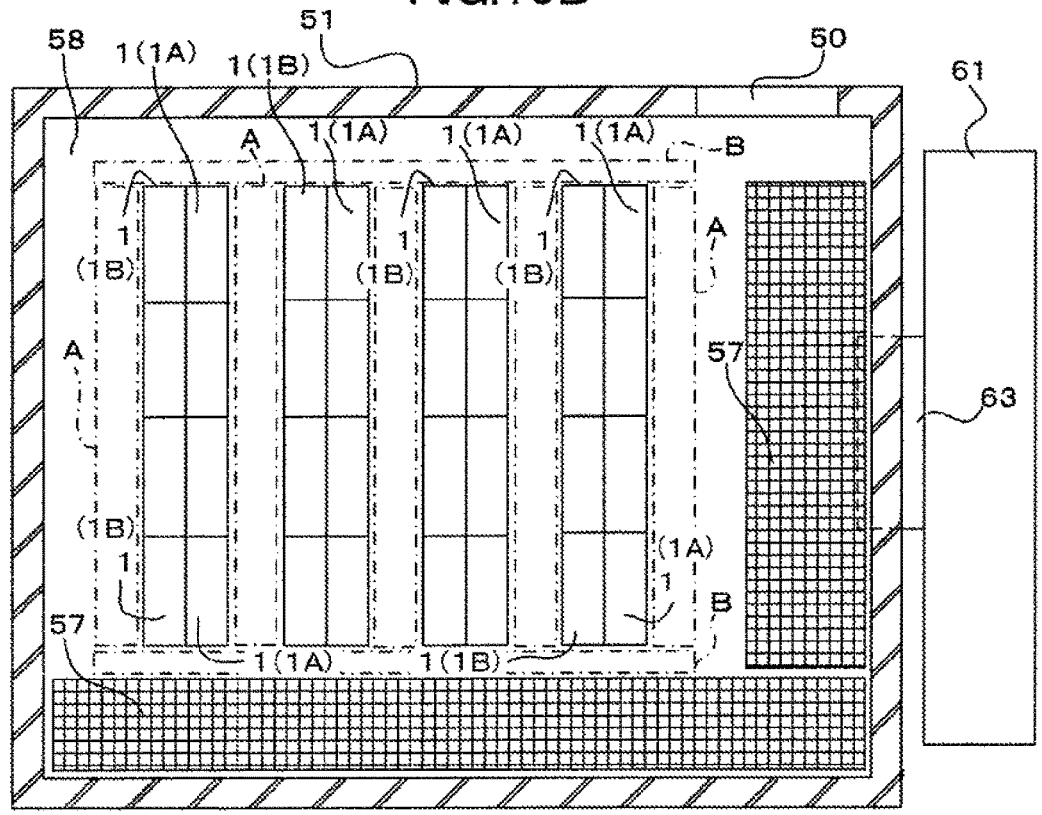

FIG. 10A is a lateral sectional view illustrating first examples of the cleanroom and the air-conditioning unit in the plant cultivation system according to the embodiment, and FIG. 10B is a plan view cut along a XB-XB line in FIG. 10A.

In FIGS. 10A and 10B, a ceiling board 53 configured to form an air supply area 52 between a ceiling surface 51a and the ceiling board 53 is attached on the upper part of the cleanroom 51 in the plant cultivation system. The ceiling board 53 includes air supply holes 53a configured to pass through air to the air supply area 52. Air filters 54 may be disposed above the air supply holes 53a of the ceiling board 53.

An exhaust path 55 is disposed at the bottom of the exhaust path 55, and an air vent floorboard 57 and an air vent protection floorboard 58 are attached via a base 56.

The air vent floorboard 57 that includes air vent holes 57a is attached above the exhaust path 55 at the bottom of the cleanroom 51. An example of the air vent floorboard 57 may be a punching metal board; however, the air vent floorboard 57 is not limited to the punching metal board. For example, a floorboard made of resin, ceramics, or the like having holes or a metallic mesh may be used as the air vent floorboard 57.

Figure 11A:
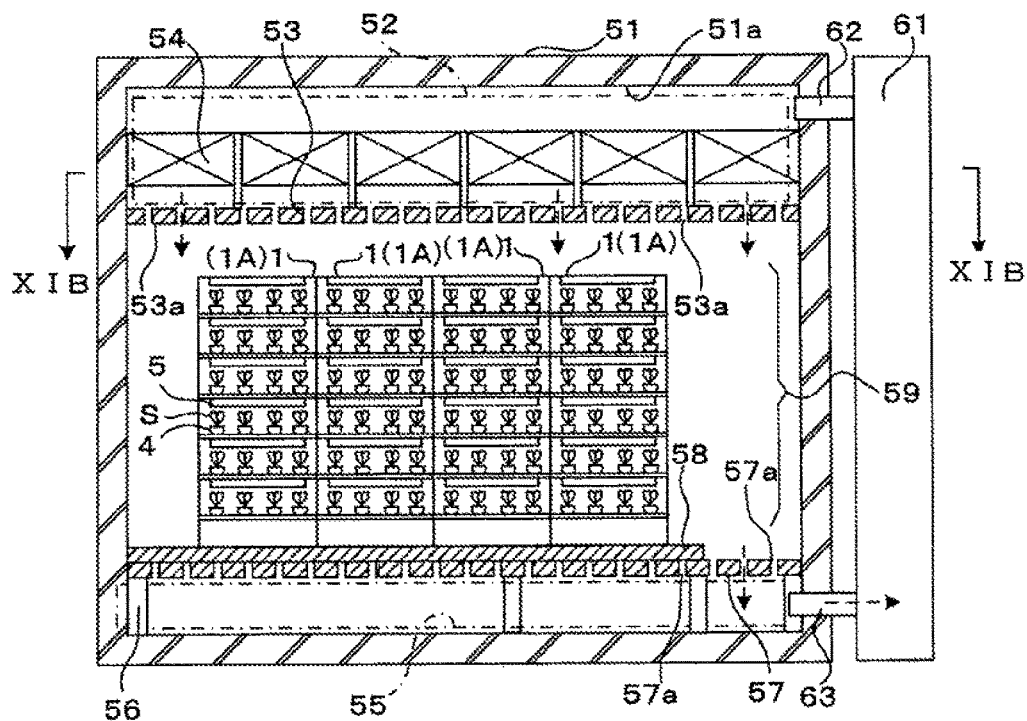
FIGS. 11A and 11B are is a sectional side view and a sectional plan view illustrating a second outlined configuration example of the plant cultivation apparatus introduced in the plant cultivation system according to an embodiment.
Figure 11B:
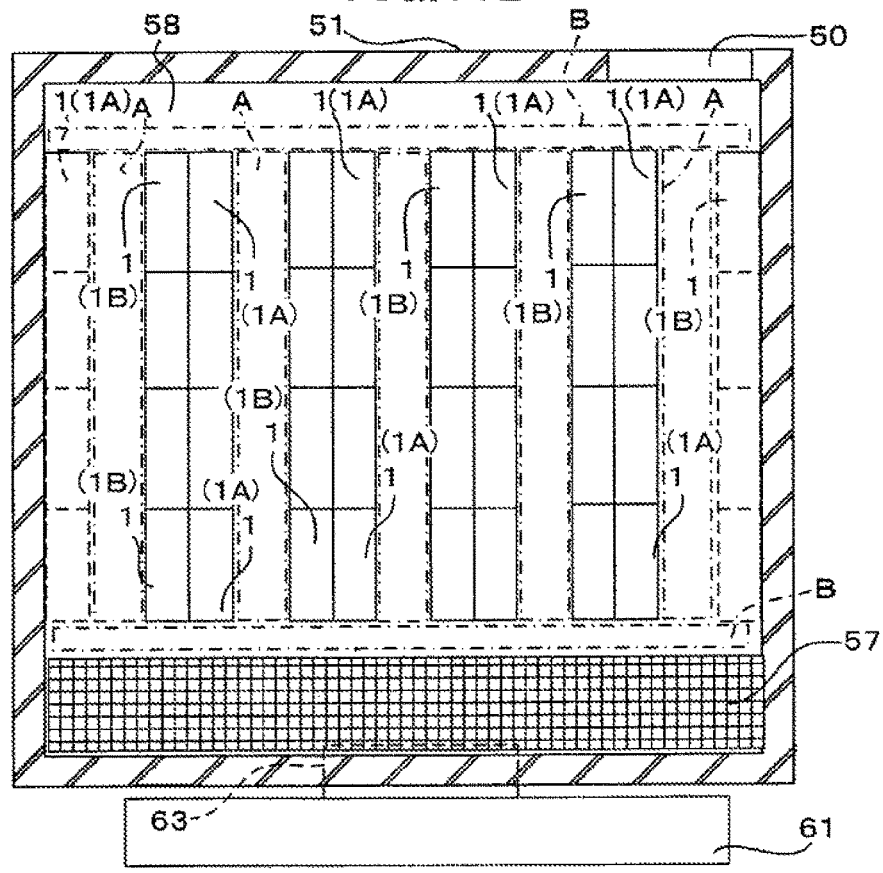

The air vent protection floor board 58 configured to close the air vent holes 57a is placed on top of the air vent floor board 57 at least in installation area of the plant cultivation apparatuses 1, as illustrated in FIGS. 10A and 10B. Note that the air vent protection floor board 58 may have a size not only to cover the installation area of the plant cultivation apparatuses 1, but also to cover the first passage A and the second passage B, as illustrated in FIGS. 11A and 11B. In an area where the air vent protection floor board 58 is placed, air directly flowing from a growing space 59 into the exhaust path 55 is blocked.

The installation area of the plant cultivation apparatuses 1 or near the installation area of the floor of the cleanroom 51 is thus a non-exhaust area, and at least a part of the air vent floor board 57 in the area excluding the non-exhaust area such as wall-side areas of the cleanroom 51 is an exhaust area. Note that the air vent floor board 57 may be placed in the area that does not overlap the air vent protection floor board 58. That is, the air vent floor board 57 may be placed on a part of the floor of the cleanroom 51, and the air vent protection floor board 58 may only be placed another part of the floor of the cleanroom 51. In this structure, an uneven part having a thickness of the air vent protection floor board 58 formed when the air vent protection floor board 58 is placed on top of the air vent floor board 57 is not formed.

The liquid fertilizer R is supplied to each of the plant cultivation apparatuses 1 installed on the air vent protection floor board 58; however, the plant cultivation apparatus 1A and the plant cultivation apparatus 1B to which different liquid fertilizers R are supplied may be disposed in the same cleanroom 51. For example, the first plant cultivation apparatus 1A to which the first liquid fertilizer R is supplied may face the second plant cultivation apparatus 1B to which the second liquid fertilizer R is supplied via the first passage A. Details of the arrangement will be described later. Note that the components of the first liquid fertilizer R may partially differ from the components of the second liquid fertilizer R.

The space sandwiched between the air vent floor board 57, the air vent protection floor board 58, and the ceiling board 53 serves as a growing space 59.

An inlet tube connected to an air supply part of an air-conditioning unit 61 is inserted into an air supply area 52 above the ceiling board 53 of the cleanroom 51. Further, an exhaust tube 63 connected to a suction part of the air-conditioning unit 61 is connected to an exhaust path 55 communicating with the air vent holes 57a of the air vent floor board 57.

The air-conditioning unit 61 may include a recirculating mechanism configured to treat the air taken from the exhaust tube 63 and return the treated air to an air supply tube 62, and an external air treating mechanism configured to clean external air and supply the cleaned air to the air supply tube 62. The air taken in the air-conditioning unit 61 is cleaned through an not-illustrated internal air filter.

Note that in FIG. 10B and FIG. 11B, a reference number 50 indicates a door in a doorway of the cleanroom 51.

In the above embodiment, when the air cleaned by passing from the air-conditioning unit 61 through the air supply tube 62 is sent to the air supply area 52 of the ceiling, the air is further cleaned by passing through the air filter 54, and the cleaned air is then discharged downward into the growing space 59 via the air supply holes 53a of the ceiling board 53.

The air discharged from the ceiling board 53 passes through the plant cultivation apparatus 1 and moves toward the air vent floor board 57 within the cleanroom 51. However, the air vent holes 57a are blocked or no air vent holes 57a are formed in the part of the air vent floor board 57 covered with the air vent protection floor board 58. Thus, the air discharged from upper parts of the plant cultivation apparatuses 1 passes through the plant cultivation apparatuses 1, and moves toward the air vent holes 57a of the air vent floor board 57 while scattering. That is, the air moves from a wide area of the ceiling board 53 to a narrow area of the air vent holes 57a. Further, the air passing through the air vent holes 57a of the air vent floor board 57 passes through the exhaust path 55 and the exhaust tube 63 below the air vent holes 57a, and then returns to the air-conditioning unit 61. The cleanroom 51 may include fans for facilitating further air circulation.

A cleanroom for use in the fabrication of semiconductor devices may be used as the cleanroom 51 serving as a confined space disposed in the plant cultivation apparatus 1. Such a cleanroom may be a so-called down-flow cleanroom that forms an airflow to cause the air to flow from an attic to a room in a direction from the ceiling to the floor in order to keep the room air clean. The air is then suctioned into an underfloor space via the air vent holes formed in the floor face, and the suctioned air is then discharged outside.

In order to form such an airflow, the cleanroom includes a punching metal formed by partially forming small punched holes in approximately an entire surface of the floor. However, when the cleanroom is directly used for plant cultivation without modification, the following problems may occur.

For example, the air discharged from the room is caused to pass through the filter by the air-conditioning unit 61 to filter dust. When the amount of water vapor in the filtering air is large, the filter may degrade quickly, for example, the filter may be clogged. Since the liquid fertilizer is supplied to the plants S, the amount of water vapor in the vicinity of the plant cultivation apparatuses 1 may be large. When the liquid fertilizer R leaks, the liquid fertilizer R may be spilled on the floor, and may enter the exhaust tube 63 via the air vent holes 57a in the floor. Thus, no air vent holes 57a may preferably be formed in the floor near the installation area of the plant cultivation apparatuses 1.

Accordingly, the cleanroom for use in fabrication of semiconductor devices is modified as follows. The air vent holes 57a formed in the installation area of the plant cultivation apparatuses 1 are covered with the air vent protection floor board 58.

Meanwhile, airflow may be required for plants S to be cultivated. If there is no airflow in the cleanroom, the air near the plants S is locally heated by heat generated by the later-described lighting device 5 to raise the ambient temperature to inhibit the growth of the plants S, or sufficient carbon dioxide required for the plants S to be cultivated is not supplied. As described above, it may be undesirable for water vapor to enter the exhaust tube 63 via the air vent holes 57a of the floor; however, it may also be undesirable to inhibit air circulation within the cleanroom by blocking al the air vent holes 57a in the floor. Further, the more the number of plants S subject to being cultivated increases, the more the confined space for installing the plant cultivation apparatuses 1 increases. Or, the more the number of plant cultivation apparatuses 1 per installation area increases, the less the airflow circulates. Thus, it may be important to control air in the cleanroom to circulate without stagnation in order to cultivate a large number of plants S.

Thus, the part of the air vent holes 57a remaining uncovered and the part of the air vent holes 57a being covered may need to be determined.

As illustrated in FIGS. 10A and 10B, the air vent holes 57a formed along wall side part of the cleanroom 51 may remain uncovered, and the air vent holes 57a formed in the central part of the cleanroom 51 may be covered with the air vent protection floor board 58. In other words, the air vent holes 57a are not formed in the floor of the installation area of the plant cultivation apparatuses 1, and the air vent holes 57a are formed in the floor of the operator's passages. For example, the air vent holes 57a are not formed in the central part of the floor in the cleanroom 51, and one or two or more plant cultivation apparatuses 1 are installed in the central part of the floor in the cleanroom 51. The air vent holes 57a are formed in the wall side part of the floor in the cleanroom 51, and the wall side part of the floor in the cleanroom 51 is used as the operator's passages without installing the plant cultivation apparatus 1. Note that the air vent holes 57a may be formed in the wall side part including all the four sides surrounding the plant cultivation apparatus 1A and the plant cultivation apparatus 1B; however, the air vent holes 57a may be formed in the wall side part only including some of the sides.

This structure may minimize the possibility of allowing the liquid fertilizer R to enter the exhaust path 55 communicating with the air vent holes 57a even if the liquid fertilizer R may occur by any chance. Further, even if there is a mass of air that partially contains water vapor in the vicinity of the plant cultivation apparatuses 1, the mass of air may be reduced by the time the air reaches the air vent holes 57a. Thus, an available period of the air-conditioning unit 61 may be extended.

Alternatively, the air vent holes 57a in the floor of the wall side part near the exhaust tube 63 connected to the underfloor space of the cleanroom 51 may remain uncovered, and the air vent holes 57a in the floor of other parts may be covered with the air vent protection floor board 58. This structure may allow the air vent holes 57a to remain in the part near the exhaust tube 63 that has strong suction force, thereby enhancing suction of air in the cleanroom and facilitating air circulation in the cleanroom 51 without stagnation.

Moreover, the cleanroom 51 may include fans for facilitating further air circulation in the room. The fans may send wind from the part of the floor where no air vent holes 57a are formed toward the part of the floor where the air vent holes 57a are formed, thereby facilitating air circulation in the entire cleanroom 51.

FIG. 11A is a lateral sectional view illustrating second examples of the clean room and the air-conditioning unit in the plant cultivation system according to the embodiment, and FIG. 11B is a plan view cut along a XIB-XIB line in FIG. 11A. In FIGS. 11A and 11B, components similar to those in FIGS. 1 to 9, and FIGS. 10A and 10B are provided with the same reference numbers.

In FIG. 11A, the arrangement of the plant cultivation apparatuses 1 with respect to the exhaust tube 63 is different from the arrangement illustrated in FIG. 10A. That is, the arrangement of the plant cultivation apparatuses 1 in FIG. 11A is orthogonal to the arrangement of the plant cultivation apparatuses 1 in FIG. 10A.

The arrangement of the plant cultivation apparatuses 1 with respect to the exhaust tube 63 in FIG. 11B may allow the air vent holes 57a in the air vent floor board 57 to suction the air in the first passage A, thereby facilitating air suction circulation. As a result, even if the suction force of the exhaust tube 63 is weak, air circulation of the air within the growing space 59 may be implemented.

In addition, in FIG. 11B, the arrangement of the air vent floor board 57 is different from the arrangement of the air vent floor board 57 in FIG. 10B. That is, in FIG. 11B, there is no air vent floor board 57 illustrated on the right wall side in FIG. 10A, and the air vent floor board 57 is disposed on the wall side where the exhaust tube 63 is disposed.

As illustrated in FIG. 11B, the air vent floor board 57 is disposed on the wall side where the exhaust tube 63 is disposed. This structure may shorten the distance between the air vent holes 57a and the exhaust tube 63. Hence, this structure may implement air circulation within the growing space 59 even if the air suction force of the exhaust tube 63 is weak, compare to the arrangement having the longer distance between the air vent holes 57a and the exhaust tube 63.

In addition, in FIG. 11B, the arrangement of the plant cultivation apparatuses 1 is different from the arrangement of the plant cultivation apparatuses 1 in FIG. 10B. That is, in FIG. 11B, additional plant cultivation apparatuses 1 are disposed at positions not illustrated in FIG. 10B; that is, additional plant cultivation apparatuses 1 are disposed at positions of the wall side areas indicated by broken lines.

Note that FIG. 11B illustrates an example in which the plant cultivation apparatuses 1 illustrated by the broken lines are disposed in contact with the walls of the cleanroom 51; however, the plant cultivation apparatuses 1 may be disposed at positions away from the walls of the cleanroom 51. The plant cultivation apparatuses 1 indicated by the broken lines have less thickness in the second passage B direction that the thickness of the plant cultivation apparatuses 1 indicated by solid lines. Accordingly, the plant cultivation apparatuses 1 having less thickness may be placed in contact with the walls in order to prevent the plant cultivation apparatuses 1 from falling during earthquakes.

As illustrated in FIG. 7, the plant cultivation apparatuses 1 to which different liquid fertilizers are supplied may simultaneously be arranged in the above-described cleanroom 51. For example, the first plant cultivation apparatus 1A to which the first liquid fertilizer R is supplied may face the second plant cultivation apparatus 1B to which the second liquid fertilizer R is supplied via the first passage A.

As illustrated in FIG. 11B, a first array of the first plant cultivation apparatuses 1A faces a second array of the second plant cultivation apparatuses 1B via the first passage A between the first and the second arrays. The plant cultivation apparatus 1A and the plant cultivation apparatus 1B are adjacently disposed back to back. The plant cultivation apparatuses 1 having different liquid fertilizer supplies are disposed as above within the growing space 59 may provide the following effects. That is, the operator who is present in the first passage A takes the carrier device 6 with the cultivation trays 4 thereon, or takes the cultivation tray 4 alone out of the plant cultivation apparatus 1A, turns the direction of the operator's body D, and places the carrier device 6 or the cultivation tray 4 into the plant cultivation apparatus 1B at the position facing the plant cultivation apparatus 1A via the first passage A, which completes changing of the liquid fertilizers supplied to the plants S. Thus, it may improve the operator's work efficiency in changing of the liquid fertilizers supplied to the plants S. The efficiency obtained by reducing working time owing to the efficient work of changing the liquid fertilizers may be improved as the number of plants subject to being cultivated increases.

Since the plant cultivation apparatuses 1 are disposed at positions indicated by the broken lines in FIG. 11B, all the plant cultivation apparatuses 1A installed and the plant cultivation apparatuses 1B face one another via the first passage A. Thus, when the operator changes the cultivation trays 4 between the plant cultivation apparatus 1A and the plant cultivation apparatus 1B according to growth periods of the plants S, the plant cultivation apparatuses 1A (or 1B) always face the plant cultivation apparatuses 1B (or 1A) via the first passage A between the plant cultivation apparatuses 1A (or 1B) and the plant cultivation apparatuses 1B (or 1A) without failing, which may improve the operator's work efficiency in changing the cultivation trays 4 as well as improving the growth efficiency of the plants S within the cleanroom 51.

In the above embodiments, timing to turn on or off the lighting devices 5 of the plant cultivation apparatuses 1 may be different; that is, as illustrated in FIGS. 10A and 10B, or FIGS. 11A and 11B, not all the lighting devices 5 of the plant cultivation apparatuses 1 installed within the growing space 59 are turned on or off simultaneously. For example, among the first and the second plant cultivation apparatuses 1A and 1B disposed within the growing space 59, it is preferable to turn off the lighting devices 5 of the second plant cultivation apparatuses 1B while the lighting devices 5 of the first plant cultivation apparatuses 1A are turned on.

Lighting the lighting devices 5 may generate substantial heat. Hence, it is undesirable to raise the temperature of the growing space 59 too high in order to maintain the temperature suitable for the growth of the plants S; it is desirable to provide the air-conditioning unit 61 with a function to control the temperature. When all the lighting devices 5 of the plant cultivation apparatuses 1 within the growing space 59 are turned on and off at the same time, the temperature during the light on may largely differ from the temperature during the light off. This may require a large amount of electric energy or large capacity for the air-conditioning unit 61 to control the room temperature. Hence, in order to control fluctuation of the room temperature, on and off of the lighting devices 5 may be mixed among the plant cultivation apparatuses 1 within the growing space 59; for example, some of the lighting devices 5 of the plant cultivation apparatuses 1 are turned on while the other lighting devices 5 of the plant cultivation apparatuses 1 are turned off. This may further lead to reduction in the electric energy consumed by the air-conditioning unit 61 for controlling the room temperature.

In another aspect, the plants S exposed to light perform photosynthesis, absorbing carbon dioxide and producing oxygen while the lighting devices 5 emit light. A sufficient amount of carbon dioxide may be required for plants S to be cultivated; it may be desirable to provide the air-conditioning unit 61 with a function to control the amount of carbon dioxide in air to be supplied to the growing space 59. Alternatively, it may be desirable to provide a not-illustrated additional apparatus having a function to control the amount of carbon dioxide in air to be supplied to the growing space 59.

When all the lighting devices 5 of the plant cultivation apparatuses 1 within the growing space 59 are turned on and off at the same time, the amount of carbon dioxide during the light on period may largely differ from the amount of carbon dioxide during the light off period within the room. This may require a large amount of electric energy or capacity for the air-conditioning unit 61 to control the amount of carbon dioxide. Hence, in order to control fluctuation of the amount of carbon dioxide, on and off of the lighting devices 5 may be mixed among the plant cultivation apparatuses 1 within the growing space 59; for example, some of the lighting devices 5 of the plant cultivation apparatuses 1 are turned on while the other lighting devices 5 of the plant cultivation apparatuses 1 are turned off. This may further lead to reduction in the electric energy consumed by the air-conditioning unit 61 for controlling the amount of carbon dioxide.

As illustrated in FIGS. 10A and 10B, and FIGS. 11A and 11B, an entire area is defined as a first area that includes respective areas disposing the cultivation racks 2 in the plant cultivation apparatuses 1A and the cultivation racks 2 in the plant cultivation apparatuses 1B, and an area between the two sets of racks 2 according to the plant cultivation system hydroponically cultivating plants using the liquid fertilizers. Further, an area differing from the first area is defined as a second area. In this structure, the air vent protection floor board 58 may be placed in the first area. Further, the air vent floor board 57 having the air vent holes 57a may be placed in the second area. Such a structure having the first area and the second area may be disposed within a confined space such as a cleanroom. In addition, the ceiling board 53 having the air supply holes 53a may be attached above the confined space. The air-conditioning unit 61 is configured to circulate air from the ceiling board 53 having the air supply holes 53a to the air vent floor board 57 having the air vent holes 57a. The air-conditioning unit 61 is connected to the confined space. In this structure, a part of the airflow within the confined space may be directed from the first area of the ceiling to the second area of the floor, thereby preventing the ambient temperature of the plants S from rising as well as preventing the ambient air from stagnating.

Further, each of the first plant cultivation apparatus 1A and the second plant cultivation apparatus 1B disposed in the plant cultivation system includes the cultivation rack 2 configured to insert the plants S into or remove the plants S from the corresponding one of the first plant cultivation apparatus 1A and the second plant cultivation apparatus 1B. In this case, an entire area including the area where cultivation racks 2 are disposed and the area between the cultivation racks 2 may be defined as a first area. Further, an area that differs from the first area and includes the air vent floor board 57 having the air vent holes 57a is defined as a second area. The exhaust tube 63 is disposed under the floor closer to the second area than the first area. Further, the down-flow cleanroom configured to circulate air from the ceiling board 53 having the air supply holes 53a communicating with the air supply area 52 connected to the air supply tube 62 via the air vent floor board 57 having the air vent holes 57a and the exhaust tube 63 to the air supply tube 62. This structure may circulate down-flow air from the first area of the ceiling of the within the confined space may be directed from the first area of the ceiling to the second area of the floor, thereby preventing the ambient temperature of the plants S from rising as well as preventing the ambient air from stagnating.

Moreover, a block layer configured to block the supply of the first liquid fertilizer R supplied to the plants S within the cultivation racks 2 of the first plant cultivation apparatus 1A, or a block layer configured to block the supply of the second liquid fertilizer R supplied to the plants S within the cultivation racks 2 of the second plant cultivation apparatus 1B, in a corresponding one of the first areas. This structure may be able to control the supply of the first or the second liquid fertilizer R.

The embodiments may be suitable for growing plants and capable of improving work efficiency.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present disclosure have been described in detail, it should be understood that various changes, substitutions, and alterations could be made hereto without departing from the spirit and scope of the invention.

What is claimed is:

1. A hydroponic cultivation method utilizing a hydroponic cultivation system, the hydroponic cultivation system including a first plant cultivation apparatus configured to hydroponically cultivate plants using a first liquid fertilizer supplied from a first supply path and to accommodate a tray carrier device having a plurality of cultivation trays with the plants thereon, each of the cultivation trays being removably connected to the first supply path via a first hose, and a second plant cultivation apparatus configured to hydroponically cultivate the plants using a second liquid fertilizer differing from the first liquid fertilizer and supplied from a second supply path and to accommodate the tray carrier device, the second plant cultivation apparatus being connected via a second hose to the second supply path, the first plant cultivation apparatus and the second plant cultivation apparatus being disposed to face each other and create a passage between the first plant cultivation apparatus and the second plant cultivation apparatus, the hydroponic cultivation method comprising:

removing the first hose from each of the cultivation trays placed on the tray carrier device before the tray carrier device is moved from the first plant cultivation apparatus to the second plant cultivation apparatus, to disconnect the cultivation trays on the tray carrier device from the first supply path;

removing, from the first plant cultivation apparatus, the tray carrier device carrying the cultivation trays with the plants thereon; and moving the tray carrier device to the second plant cultivation apparatus via the passage, wherein each of the first hose and the second hose includes a funnel-shaped upper end, and the moving includes:

reversing a side of the tray carrier device facing the passage when the tray carrier device is accommodated in the first plant cultivation apparatus, so that the side of the tray carrier device after the reversing faces the passage when the tray carrier device is accommodated in the second plant cultivation apparatus, attaching the cultivation trays on the tray carrier device to the second plant cultivation apparatus by using the tray carrier device, and placing the second supply path of the second plant cultivation apparatus in a connected state with each of the cultivation trays on the tray carrier device by using the second hose including the funnel-shaped upper end, to change the first liquid fertilizer, previously supplied to the plants on the cultivation trays from the first supply path, to the second liquid fertilizer that is presently supplied to the plants on the cultivation trays from the second supply path.

2. The hydroponic cultivation method as claimed in claim 1, further comprising:

removably inserting the second hose via which the second plant cultivation apparatus is connected to the second supply path into a same liquid fertilizer introducing area into which the first hose has been previously inserted, after the tray carrier device is moved to the second plant cultivation apparatus.

* * * * *